United States Patent

Tomura et al.

[11] Patent Number: 5,863,703
[45] Date of Patent: Jan. 26, 1999

[54] OPTICAL INFORMATION RECORDING MEDIUM USING A PHTHALOCYANINE COMPOUND

[75] Inventors: Tatsuya Tomura; Noboru Sasa; Tsutomu Sato, all of Yokohama, Japan

[73] Assignee: Ricoh Company, Ltd., Tokyo, Japan

[21] Appl. No.: 601,433

[22] Filed: Feb. 12, 1996

[30] Foreign Application Priority Data

Feb. 10, 1995 [JP] Japan ................................ 7-046286
Feb. 13, 1995 [JP] Japan ................................ 7-047806

[51] Int. Cl.$^6$ ........................................................ G11B 7/24
[52] U.S. Cl. ...................................... 430/270.16; 430/945
[58] Field of Search ........................ 430/270.15, 270.16, 430/270.17, 945; 369/284, 288

[56] References Cited

U.S. PATENT DOCUMENTS

| | | |
|---|---|---|
| 4,626,496 | 12/1986 | Sato . |
| 4,656,121 | 4/1987 | Sato et al. . |
| 4,714,667 | 12/1987 | Sato et al. . |
| 4,735,839 | 4/1988 | Sato et al. . |
| 4,737,444 | 4/1988 | Satoh et al. . |
| 4,752,554 | 6/1988 | Sato et al. . |
| 4,758,499 | 7/1988 | Abe et al. . |
| 4,767,693 | 8/1988 | Oba et al. . |
| 4,891,305 | 1/1990 | Oba et al. . |
| 5,002,812 | 3/1991 | Umehara et al. . |
| 5,028,467 | 7/1991 | Maruyama et al. . |
| 5,085,909 | 2/1992 | Satoh et al. . |
| 5,149,819 | 9/1992 | Satoh et al. . |
| 5,256,794 | 10/1993 | Sato et al. . |
| 5,260,165 | 11/1993 | Satou et al. . |
| 5,391,461 | 2/1995 | Koike et al. ............ 430/270.16 |
| 5,484,685 | 1/1996 | Tai et al. ............... 430/270.17 |

FOREIGN PATENT DOCUMENTS

3215466 9/1991 Japan .

*Primary Examiner*—John A. McPherson
*Attorney, Agent, or Firm*—Cooper & Dunham LLP

[57] ABSTRACT

A phthalonitrile compound of formula (I);

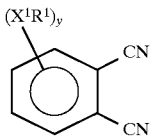

(I)

and a diiminoisoindoline compound of formula (II):

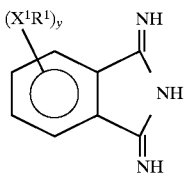

(II)

are allowed to react to produce a phthalocaynine compound of formula (III),

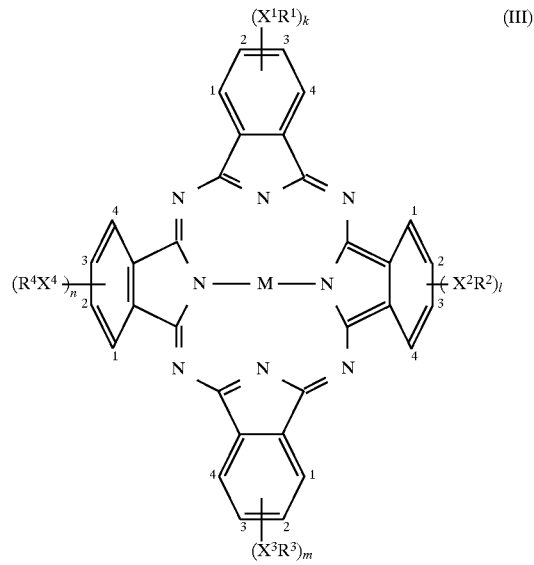

(III)

which is an effective material for a near-infrared absorbing material and also as a recording material for an optical information recording medium. The methods of producing the phthalonitrile compound of formula (I) and the pthalocaynine compound of formula (III) are proposed.

10 Claims, 8 Drawing Sheets

F I G. 1(a) 
F I G. 1(b) 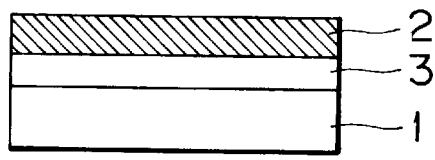
F I G. 1(c) 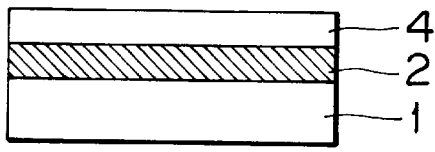
F I G. 1(d) 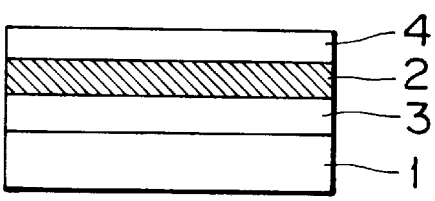
F I G. 2(a) 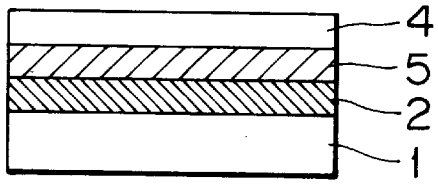
F I G. 2(b) 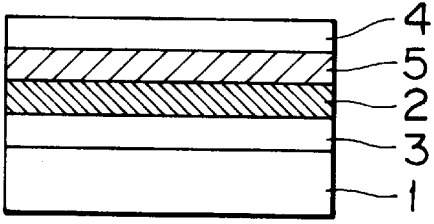

F I G. 8
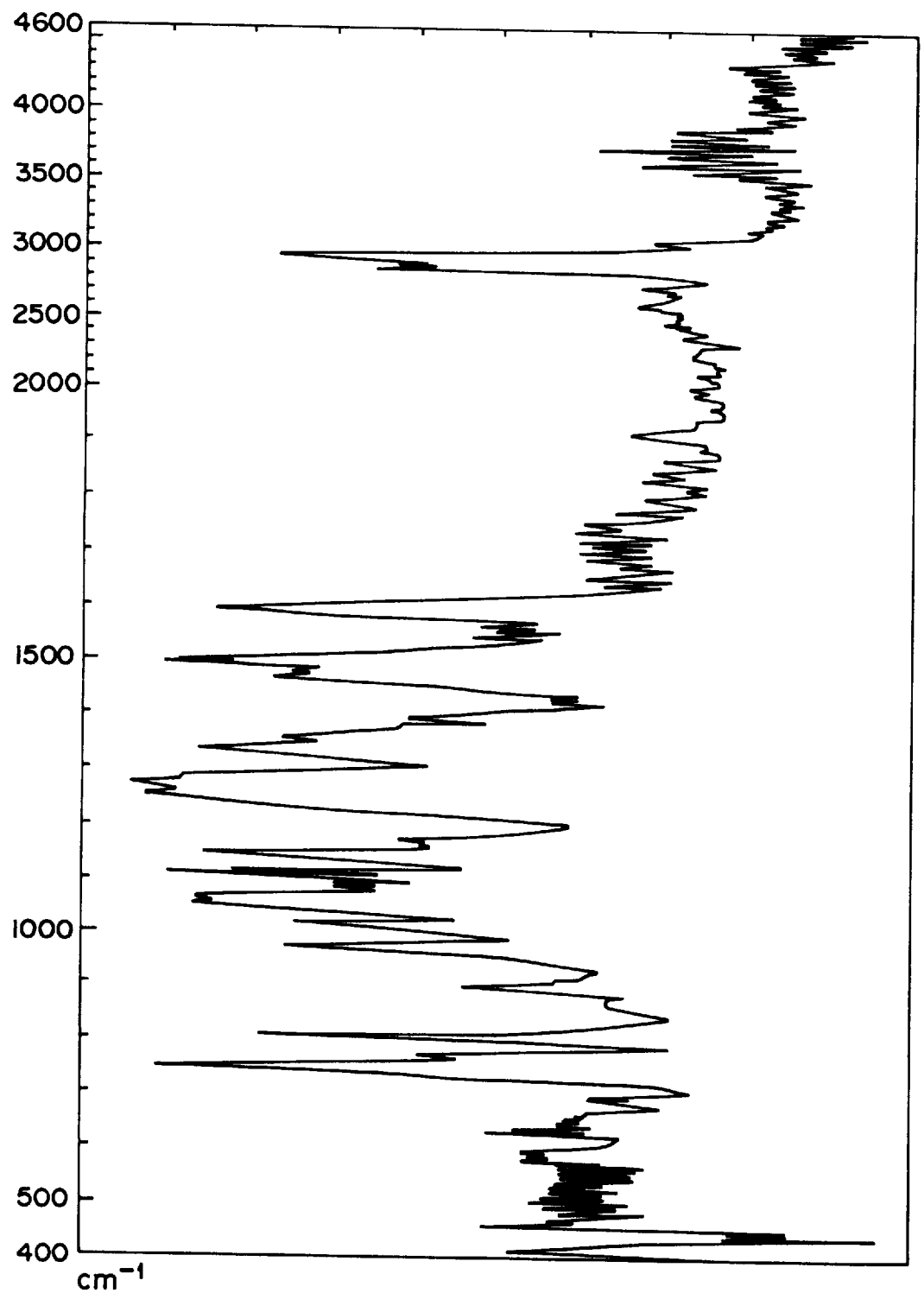

OPTICAL INFORMATION RECORDING MEDIUM USING A PHTHALOCYANINE COMPOUND

BACKGROUND OF THE INVENTION

1. Field of the Invention

The present invention relates to a near-infrared absorbing material comprising a phthalocyanine compound which can also be used as a recording material for use in an optical information recording medium, a photoelectric conversion material, and a material for use in an infrared filter; a phthalonitrile compound and a diiminoisoindoline compound serving as intermediates for producing such phthalocyanine compounds capable of absorbing near infrared rays; and methods of producing such phthalonitrile compounds.

In addition, the present invention also relates to an optical information recording medium which comprises as a recording material the above-mentioned near-infrared absorbing material comprising such a phthalocyanine compound.

2. Discussion of Background

Materials capable of absorbing near infrared rays find a variety of applications, for example, in (i) safe-light filters for photosensitive materials which are sensitive to infrared rays; (ii) infrared filters for controlling the growth of plants; (iii) materials for intercepting the heat rays in sunlight; (iv) infrared filters for protecting eye tissues from infrared rays; and (v) infrared filters for the light receiving elements of semiconductors. In addition to the above, a recording material of an optical information recording medium is one of the important applications of the above-mentioned near-infrared-ray-absorbing materials.

Conventionally, cyanine dyes, phenanthrene dyes, naphthoquinone dyes, pyrylium dyes and squarylium dyes are known as materials capable of absorbing infrared rays, In Japanese Laid-Open Patent Applications 55-97033, 58-83344, 58-224793, 58-214162, and 59-24692, optical information recording media are disclosed which comprise any of the aforementioned dyes as recording materials.

Each of the above-mentioned dyes, however, has its own shortcomings when used as a recording material in the optical information recording medium. More specifically, phenanthrene dyes, naphthoquinone dyes, and squarylium dyes have low reflectance although they can be readily vacuum-deposited. The low reflectance will bring about a low contrast between an information recorded area formed by application of laser beams and a non-information recorded area. This will cause inaccurate reproduction of the recorded information.

Pyrylium dyes and cyanine dyes are soluble in solvents, so that they can be applied by liquid coating. However, these dyes are so poor in light-resistance that they are readily caused to deteriorate when exposed to the light employed for the reproduction of recorded information, and exposed to natural light.

In contrast to the previously mentioned dyes, phthalocyanine dyes have remarkably high thermal stability and photostability, so that there are proposed recording media, each of which comprises a phthalocyanine compound in an organic-dye-containing thin film, as disclosed in Japanese Laid-Open Patent Applications 58-183296 and 58-37851. In spite of the above-mentioned advantages of the phthalocyanine compounds, they have a shortcoming in the productivity thereof. To be more specific, a thin film of such a phthalocyanine compound can be made only by vacuum-deposition because it is impossible to use a coating method due to the poor solubility in organic solvents. In addition, the phthalocyanine compound easily tends to cause association of the molecules thereof, so that high refractive index and high reflectance cannot be obtained when used in an optical information recording medium.

Recently, in order to increase the recording density in the field of information recording, a semiconductor laser beam with a specific wavelength, that is, 680 nm or less, which is shorter than the wavelength range of the laser beam used for a conventional optical recording disk has been put to practical use. However, any conventional organic-dye-containing thin film for use in the optical disk does not exhibit appropriate light absorption and reflection in the wavelength range of 700 nm or less. Namely, high-density recording has been limited because an appropriate recording material for use in the optical recording medium is not available.

Furthermore, a write-once CD-R (CD Recordable) comprising a substrate, an organic-dye-containing thin film, a metal reflection layer and a protective layer, which are successively overlaid in this order, is required to exhibit high reflectance in order to satisfy the CD standards. Therefore, there is a demand for development of an organic dye material which has high stability and is capable of exhibiting high refractive index in the wavelength range of the reproduction light, namely, in the range of 700 to 830 nm.

To prevent the association of the molecules of the phthalocyanine compound and also to obtain high refractive index thereof when used in an optical information recording medium, the introduction of a bulky alkoxyl group at the $\alpha$-position of the phthalocyanine has been carried out. Further, there are proposed various recording media of CD-R type which can match the shorter wavelength of the laser beam by halogenating the phthalocyanine compound for use in the organic-dye-containing thin film, as disclosed in Japanese Laid-Open Patent Applications 3-62878, 3-215466, 4-348168, 4-226390, 4-15263, 4-15264, 4-15265, 4-15266, 5-17477, 5-86301, 5-25177, 5-25179, 5-17700, and 5-1272.

However, the above-mentioned conventional phthalocyanine compounds are still unsatisfactory as the recording materials for use in the optical information recording medium although the refractive index thereof is improved.

SUMMARY OF THE INVENTION

Accordingly, it is a first object of the present invention to provide intermediates for producing a phthalocyanine compound which can be employed without impairing the inherent stability thereof in a near-infrared absorbing material, and which has high solubility in organic solvents and high productivity.

A second object of the present invention is to provide a method of producing such a phthalonitrile compound serving as one of the above-mentioned intermediates for producing the phthalocyanine compound.

A third object of the present invention is to provide a near-infrared absorbing material comprising the above-mentioned phthalocyanine compound, which is capable of absorbing near-infrared rays with high absorbance.

A fourth object of the present invention is to provide a method of producing the above-mentioned phthalocyanine compound for use in the near-infrared absorbing material.

A fifth object of the present invention is to provide an optical information recording medium which comprises as a recording material the above-mentioned phthalocyanine compound and can be fabricated with high productivity by a method of coating the phthalocyanine compound by dissolving it in an organic solvent.

A sixth object of the present invention is to provide an optical information recording medium applicable to an optical pick-up system using a semiconductor laser beam with a wavelength of 630 to 720 nm, which is capable of carrying out high-density recording.

A seventh object of the present invention is to provide an optical information recording medium capable of exhibiting high refractive index in the wavelength range of 770 to 830 nm, which can be formed into a CD-R medium with high reflectance, excellent shelf stability and improved reproduction stability.

The above-mentioned first object of the present invention can be achieved by a first pair of a phthalonitrile compound and a diiminoisoindoline compound:

A phthalonitrile compound of formula I-(I):

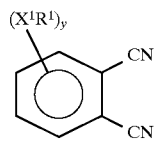

wherein $X^1$ is an oxygen atom or sulfur atom; $R^1$ is a cyclic substituent selected from the group consisting of cyclic substituents (a) to (f), each of which may have a substituent:

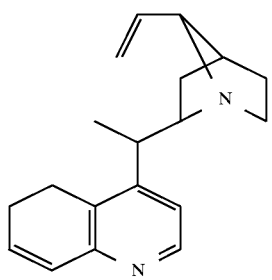

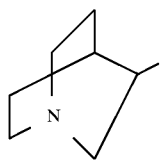

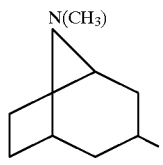

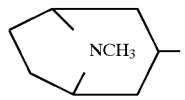

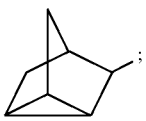

and y is an integer of 1 or 2.

A diiminoisoindoline compound of formula I-(II):

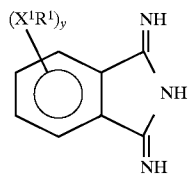

wherein $X^1$ is an oxygen atom or sulfur atom; $R^1$ is a cyclic substituent selected from the group consisting of same cyclic substituents (a) to (f) as defined in the above phthalonitrile compound of formula I-(I).

The second object of the present invention is achieved by the following method of producing the phthalonitrile compound of formula I-(I), which comprises the step of allowing 3- or 4-nitrophthalonitrile to react with an alcohol derivative or mercaptan derivative having one cyclic substituent selected from the group consisting of the above-mentioned cyclic substituents (a) to (f) in an organic solvent in the presence of sodium hydride.

In particular, a phthalonitrile compound of formula I-(I) wherein $X^1$ is an oxygen atom can be prepared by allowing one component selected from the group consisting of 3-hydroxyphthalonitrile, 4-hydroxy-phthalonitrile and 2,3-dicyanohydroquinone to react with a halide having one cyclic substituent selected from the group consisting of the cyclic substituents (a) to (f) in an organic solvent in the presence of an alkali.

The third object of the present invention can be achieved by a near-infrared absorbing material comprising a phthalocyanine compound of formula I-(III):

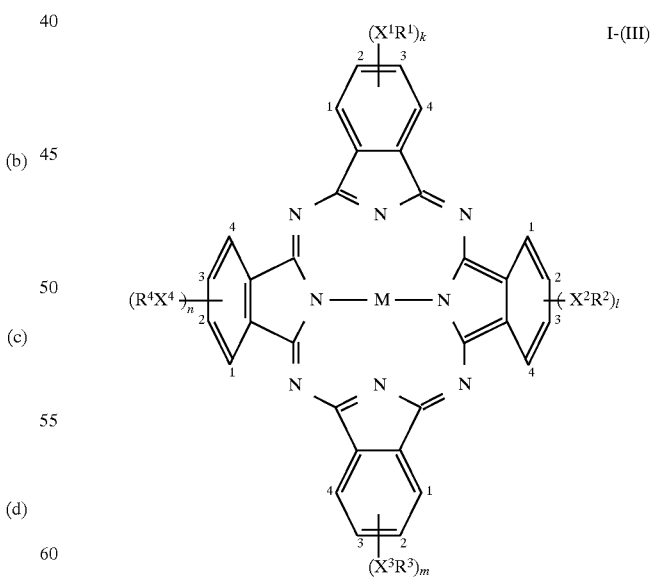

wherein M represents two hydrogen atoms, or a bivalent, trivalent or tetravalent metal which may have a halogen atom or an oxygen atom; $X^1$ to $X^4$ are each an oxygen atom or sulfur atom; $R^1$ to $R^4$ are each a cyclic substituent selected from the group consisting of the same cyclic substituents (a) to (f) as defined in the phthalonitrile compound of formula I-(I), and k, l, m, and n are each an integer of 0 to 4, provided that k, l, m, and n are not 0 at the same time, and that when each of k, l, m and n is 3 or less, the other substituents for each benzene ring are a hydrogen atom or a halogen atom.

The fourth object of the present invention can be achieved by a method of producing the metallo-phthalo-cyanine compound of formula I-(III):

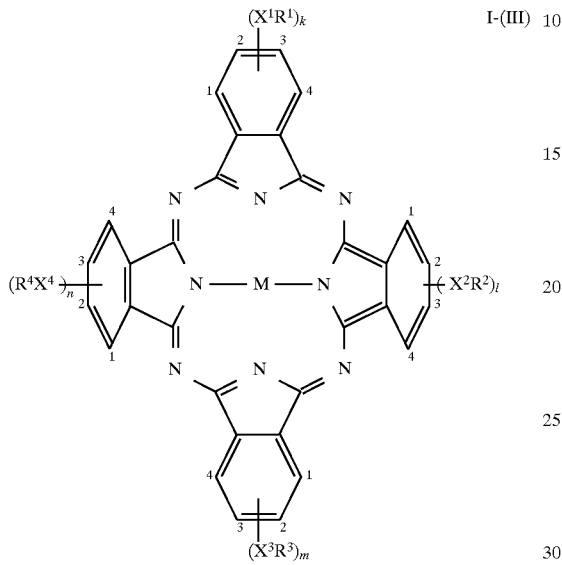

wherein M represents a bivalent, trivalent or tetravalent metal which may have a halogen atom or an oxygen atom; $X^1$ to $X^4$ are each an oxygen atom or sulfur atom; $R^1$ to $R^4$ are each a cyclic substituent selected from the group consisting of the same cyclic substituents (a) to (f) as defined in the phthalonitrile compound of formula I-(I), and k, l, m, and n are each an integer of 0 to 4, provided that k, l, m, and n are not 0 at the same time, and that when each of k, l, m, and n is 3 or less, the other substituents for each benzene ring are a hydrogen atom or a halogen atom, comprising the step of allowing at least one phthalonitrile compound represented by formula I-(I) or at least one diiminoisoindoline compound represented by formula I-(II) to react with a metal or a metal derivative in an organic solvent:

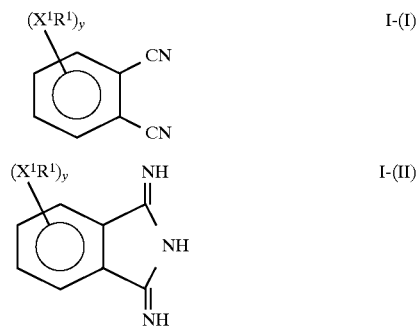

wherein $X^1$ is an oxygen atom or sulfur atom; $R^1$ is a cyclic substituent selected from the group consisting of said cyclic substituents (a) to (f), and y is an integer of 1 or 2.

The fourth object of the present invention can also be achieved by a method of producing a metal-free phthalocyanine compound of formula I-(III):

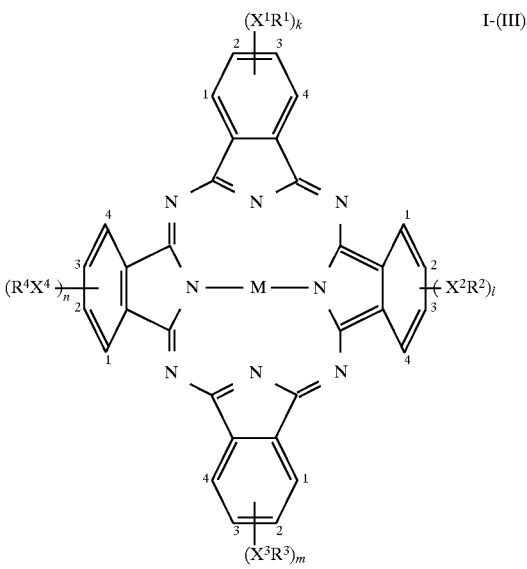

wherein M represents two hydrogen atoms; $X^1$ to $X^4$ are each an oxygen atom or sulfur atom; $R^1$ to $R^4$ are each a cyclic substituent selected from the group consisting of the same cyclic substituents (a) to (f) as defined previously, and k, l, m, and n are each an integer of 0 to 4, provided that k, l, m, and n are not 0 at the same time, and that when each of k, l, m, and n is 3 or less, the other substituents for each benzene ring are a hydrogen atom or a halogen atom, comprising the step of allowing at least one phthalonitrile compound represented by formula I-(I) or at least one diiminoisoindoline compound represented by formula I-(I) to react with lithium or sodium in an organic solvent:

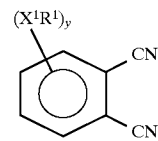

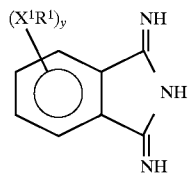

wherein $X^1$ is an oxygen atom or sulfur atom; $R^1$ is a cyclic substituent selected from the group consisting of said cyclic substituents (a) to (f), and y is an integer of 1 or 2.

The fifth and sixth objects of the present invention can be achieved by an optical information recording medium comprising a substrate, and a recording layer formed thereon comprising the previously defined phthalocyanine compound of formula I-(III).

The above optical information recording medium may further comprise an undercoat layer between the substrate and the recording layer, or a protective layer on the recording layer.

The seventh object of the present invention can be achieved by the above-mentioned optical information recording medium which further comprise a metal reflection layer between the recording layer and the protective layer.

For the above-mentioned optical information recording media, a phthalocyanine compound of formula I-(III) in which each of k, l, m and n is an integer of 1 or 2, one or two substituents are bonded to each benzene ring at the position 1 and/or 4, and the other substituents are a hydrogen atom or a halogen atom is particularly preferable.

The previously mentioned first object of the present invention can also be achieved by a second pair of a phthalonitrile compound and a diiminoisoindoline compounds:

A phthalonitrile compound of formula II-(I):

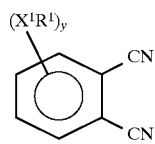

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via a methylene group; and y is an integer of 1 or 2.

A diiminoisoindoline compound of formula II-(II):

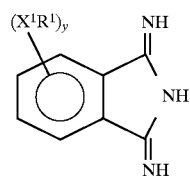

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via a methylene group; and y is an integer of 1 or 2.

The second object of the present invention can also be achieved by a method of producing the phthalonitrile compound of formula II-(I), which comprises the step of allowing 3- or 4-nitrophthalo-nitrile to react with an alcohol derivative or mercaptan derivative having a radical selected from the group consisting of a bornane radical, a norbornane radical and a norbornene radical in an organic solvent in the presence of sodium hydride.

In particular, a phthalonitrile compound of formula II-(I) wherein $X^1$ is an oxygen atom can be prepared by allowing one component selected from the group consisting of 3-hydroxyphthalonitrile, 4-hydroxy-phthalonitrile and 2,3-dicyanohydroquinone to react with a halide having a radical selected from the group consisting of a bornane radical, a norbornane radical and a norbornene radical in an organic solvent in the presence of an alkali.

The third object of the present invention can also be achieved by a near-infrared absorbing material comprising a phthalocyanine compound of formula II-(III):

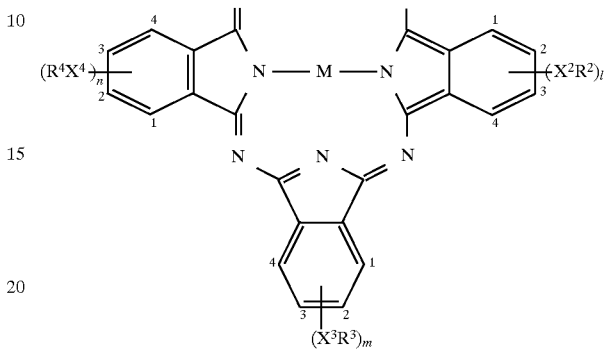

wherein M represents two hydrogen atoms, or a bivalent, trivalent or tetravalent metal which may have a halogen atom or an oxygen atom; $X^1$ to $X^4$ are each an oxygen atom or sulfur atom; $R^1$ to $R^4$ are each a radical selected from the group consisting of a bornane radical, a norbornane radical and a norbornene radical, each of which may have a substituent or may be bonded to $X^1$ via a methylene group; and k, l, m, and n are each an integer of 0 to 4, provided that k, l, m, and n are not 0 at the same time, and that when each of k, l, m, and n is 3 or less, the other substituents for each benzene ring are a hydrogen atom or a halogen atom.

The fourth object of the present invention can be achieved by a method of producing a metallo-phthalo-cyanine compound of formula II-(III),

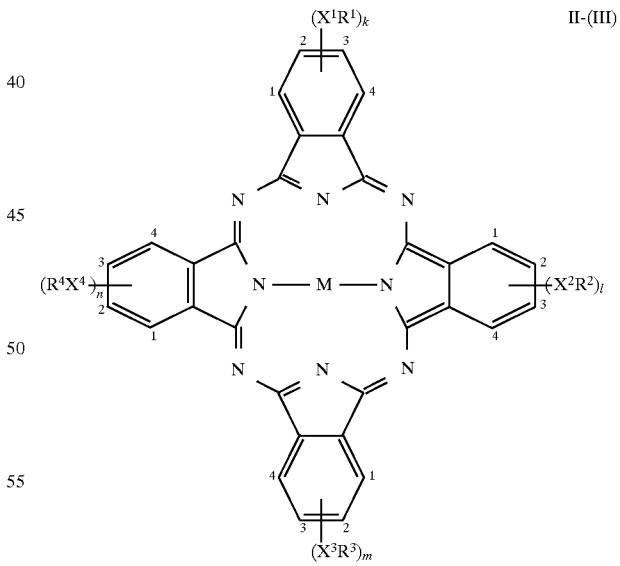

wherein M represents a bivalent, trivalent or tetravalent metal which may have a halogen atom or an oxygen atom; $X^1$ to $X^4$ are each an oxygen atom or sulfur atom; $R^1$ to $R^4$ are each a radical selected from the group consisting of a bornane radical, a norbornane radical and a norbornene radical, each of which may have a substituent or may be bonded to $X^1$ via a methylene group; and k, l, m and n are each an integer of 0 to 4, provided that k, l, m and n are not 0 at the same time, and that when each of k, l, m and n is 3 or less, the other substituents for each benzene ring are a hydrogen atom or a halogen atom, comprising the step of allowing at least one phthalonitrile compound of formula II-(I) or at least one diiminoisoindoline compound of formula II-(II) to react with a metal or a metal derivative in an organic solvent:

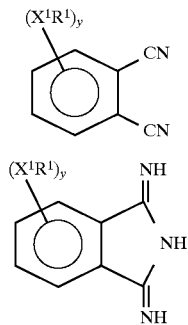

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via methylene group; and y is an integer of 1 or 2.

The fourth object of the present invention can also be achieved by a method of producing a metal-free phthalocyanine compound of formula II-(III):

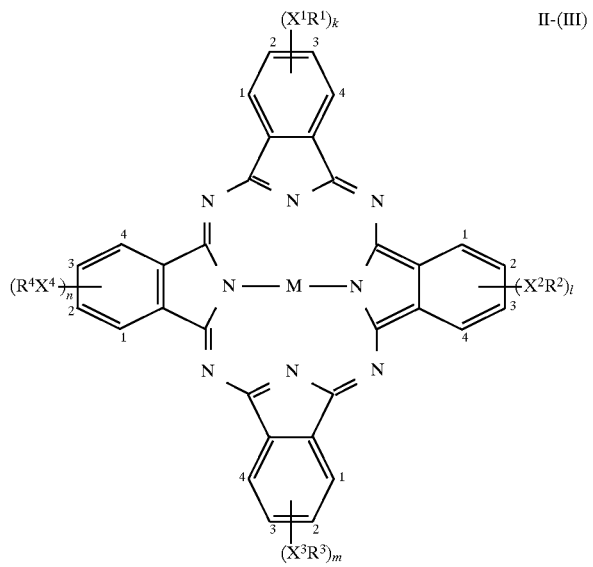

wherein M represents two hydrogen atoms; $X^1$ to $X^4$ are each an oxygen atom or sulfur atom; $R^1$ to $R^4$ are each a radical selected from the group consisting of a bornane radical, a norbornane radical and a norbornene radical, each of which may have a substituent or may be bonded to $X^1$ via a methylene group; and k, l, m and n are each an integer of 0 to 4, provided that k, l, m and n are not 0 at the same time, and that when each of k, l, m and n is 3 or less, the other substituents for each benzene ring are a hydrogen atom or a halogen atom, comprising the step of:

allowing at least one phthalonitrile compound represented by formula II-(I) or at least one diiminoisoindoline compound represented by formula II-(II) to react with lithium or sodium in an organic solvent:

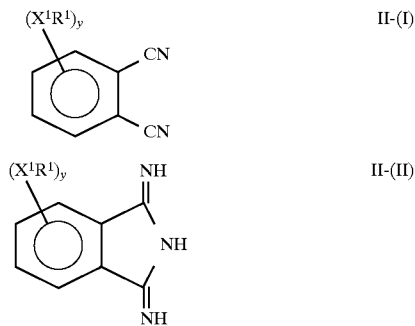

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via a methylene group; and y is an integer of 1 or 2.

The fifth and sixth objects of the present invention can be achieved by an optical information recording medium comprising a substrate, and a recording layer formed thereon comprising the previously defined phthalocyanine compound of formula II-(III).

The above optical information recording medium may further comprise an undercoat layer between the substrate and the recording layer, or a protective layer on the recording layer.

The seventh object of the present invention can be achieved by the above-mentioned optical information recording medium which further comprise a metal reflection layer between the recording layer and the protective layer.

For the above-mentioned optical information recording media, a phthalocyanine compound of formula II-(III) in which each of k, l, m and n is an integer of 1 or 2, one or two substituents are bonded to each benzene ring at the position 1 and/or 4, and the other substituents are a hydrogen atom or a halogen atom is particularly preferable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1(a) to 1(d) are schematic cross-sectional views of examples of an optical information recording medium according to the present invention.

FIGS. 2(a) and 2(b) are schematic cross-sectional views of examples of an optical information recording medium according to the present invention, which are of a different type from the type of the optical information recording media shown in FIGS. 1(a) to 1(d).

FIG. 8 is an infrared spectrum of a phthalocyanine compound of the present invention obtained in Synthesis Example II-9.

DESCRIPTION OF THE PREFERRED EMBODIMENTS

Figure 3:
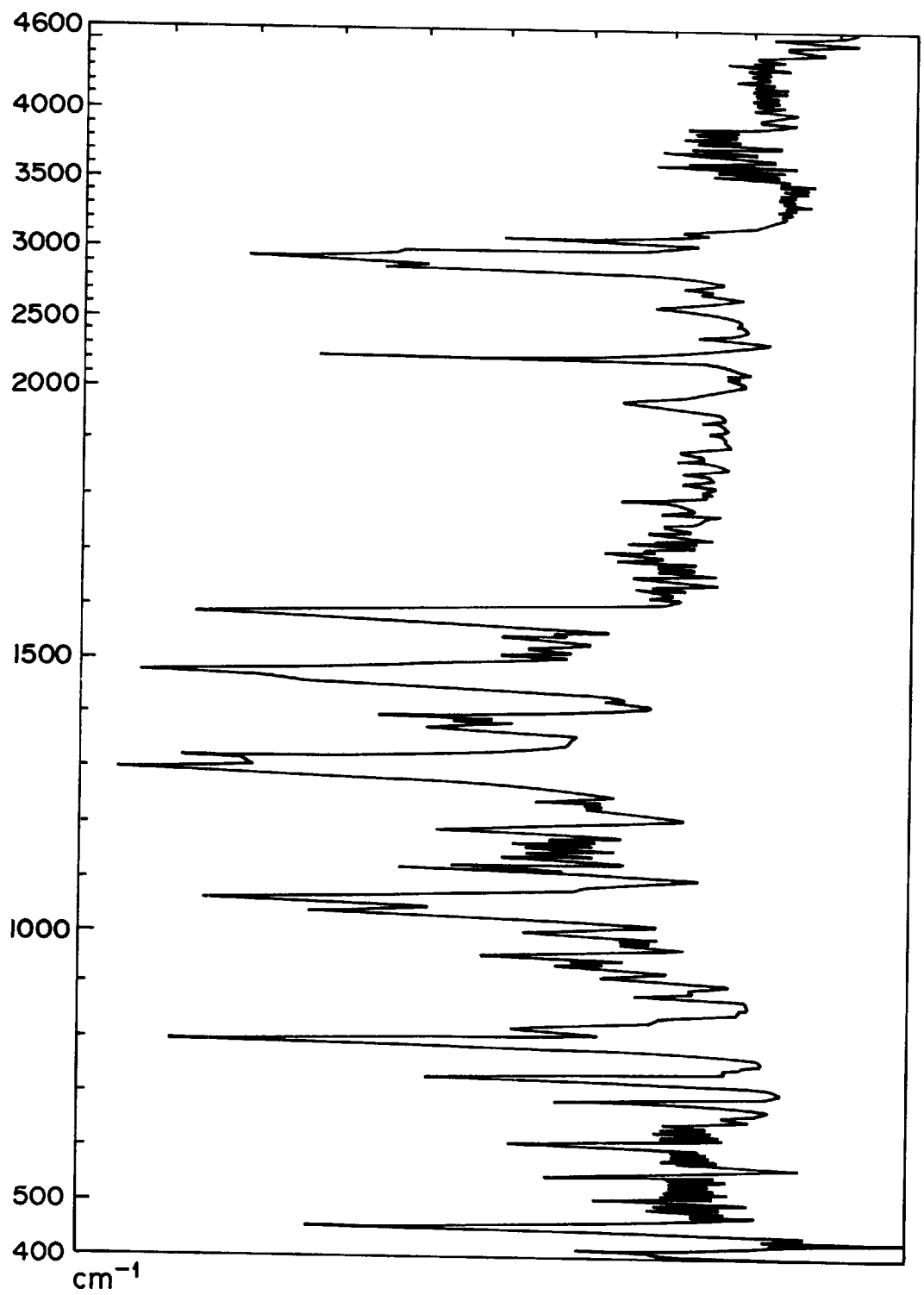
FIG. 3 is an infrared spectrum of a phthalonitrile compound of the present invention obtained in Synthesis Example II-1.

One of the phthalonitrile compounds of the present invention has the following formula I-(I), which is useful as an intermediate for producing a phthalocyanine compound for use in a near-infrared absorbing material:

$$(X^1R^1)_y \quad \text{benzene ring with two CN groups} \quad \text{I-(I)}$$

wherein $X^1$ is an oxygen atom or sulfur atom; $R^1$ is a cyclic substituent selected from the group consisting of cyclic substituents (a) to (f), each of which may have a substituent:

(a), (b), (c), (d), (e), (f)

y is an integer of 1 or 2.

Specific examples of the cyclic substituents (a) to (f) in the above are cyclocylic radicals shown in the following Table I-(1):

(1), (2), (3), (4), (5), (6)

-continued (7)

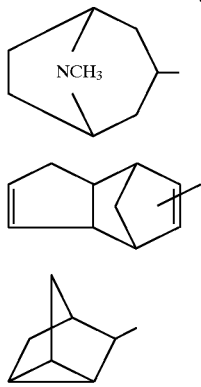

(8)

(9)

The above phthalonitrile compound of formula I-(I) can prepared by a method comprising the step of allowing 3- or 4-nitrophthalonitrile to react with an alcohol derivative or mercaptan derivative having one cyclic substituent selected from the group consisting of the above-mentioned cyclic substituents (a) to (f) in an organic solvent in the presence of sodium hydride in accordance with the following reaction scheme I-A:

Reaction Scheme I-A

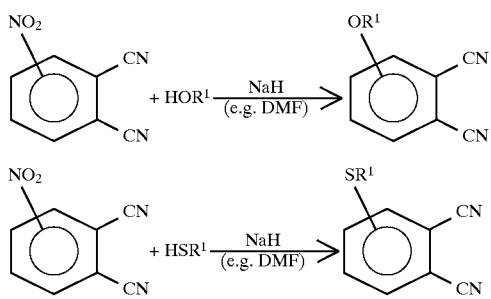

Specific examples of the alcohol derivative having one cyclic substituent and the mercaptan derivative having one cyclic substituent are alcohol derivatives and mercaptan derivatives having the substituents as shown in the previously provided Table I-(1).

Specific examples of an organic solvent for use in the above reactions are N,N-dimethylformaldehyde, N,N-dimethylacetamide, 1-methyl-2-pyrrolidone and dimethyl sulfoxide. Of these organic solvents, N,N-dimethylformaldehyde and N,N-dimethylacetamide are particularly preferable for use in the present invention.

A phthalonitrile compound of the above-mentioned formula I-(I), in which $X^1$ is an oxygen atom, can be prepared by a method comprising the step of allowing one component selected from the group consisting of 3-hydroxyphthalonitrile, 4-hydroxy-phthalonitrile and 2,3-dicyanohydroquinone to react with a halide having one cyclic substituent selected from the group consisting of above-mentioned cyclic substituents (a) to (f) in an organic solvent in the presence of an alkali in accordance with the following reaction scheme I-B:

Reaction Scheme I-B

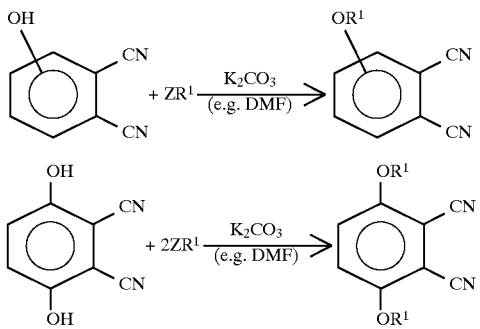

wherein Z is a halogen atom.

More specifically, 3-hydroxyphthalonitrile, 4-hydroxyphthalonitrile or 2,3-dicyanohydroquinone is dissolved in an organic solvent, together with an alkali such as potassium carbonate or sodium hydroxide, and then is allowed to react with the above-mentioned halide, whereby the phthalonitrile compound of the above-mentioned formula I-(I), in which $X^1$ is an oxygen atom, can be prepared.

As the above-mentioned halide having the cyclic substituent, halides having any of the substituents shown in the previously mentioned Table I-(1) can be employed.

As the organic solvent for use in the reactions in the above reaction scheme I-B, the same organic solvents as employed in the preparation of the phthalonitrile compound of formula I-(I) in the previously mentioned reaction scheme I-A can be employed.

A diiminoisoindoline compound of the following formula I-(II) of the present invention is a novel compound and useful as an intermediate for producing a phthalocyanine compound for use in a near-infrared absorbing material:

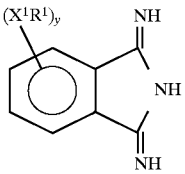

I-(II)

wherein $X^1$ is an oxygen atom or sulfur atom; $R^1$ is a cyclic substituent selected from the group consisting of cyclic substituents (a) to (f), each of which may independently have a substituent:

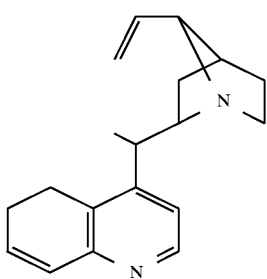

(a)

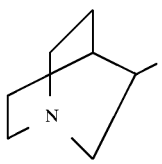

(b)

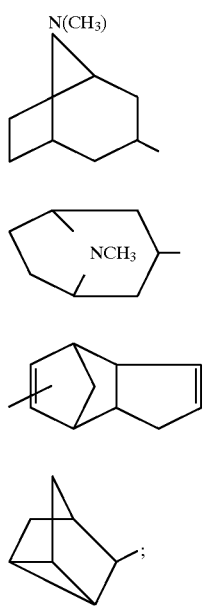

and y is an integer of 1 or 2.

Specific examples of the cyclic substituents (a) to (f) in the above are the same cyclocylic radicals shown in the previously provided Table I-(1).

The diiminoisoindoline compound of the following formula I-(II) of the present invention can be prepared by allowing any of phthalonitrile compounds represented by the previously mentioned formula I-(I) to react with ammonia in alcohol in the presence of metal sodium or sodium alkoxide in accordance with the following reaction scheme I-C:

Reaction Scheme I-C

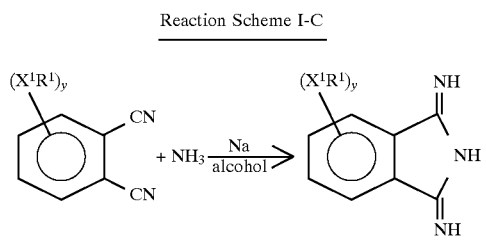

A representative example of the alcohol used as the solvent in the above reaction is methyl alcohol.

A near-infrared absorbing material for use in the present invention comprises a phthalocyanine compound of the following formula I-(III), which is a novel compound:

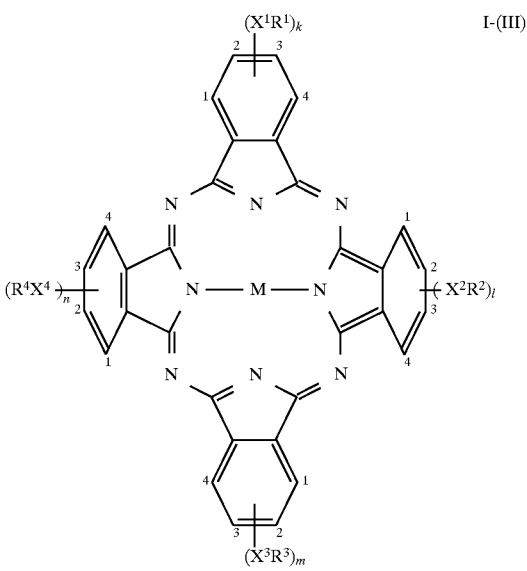

wherein M represents two hydrogen atoms, or a bivalent, trivalent or tetravalent metal which may have a halogen atom or an oxygen atom; $X^1$ to $X^4$ are each an oxygen atom or sulfur atom; $R^1$ to $R^4$ are each a cyclic substituent selected from the group consisting of cyclic substituents (a) to (f), each of which may independently have a substituent:

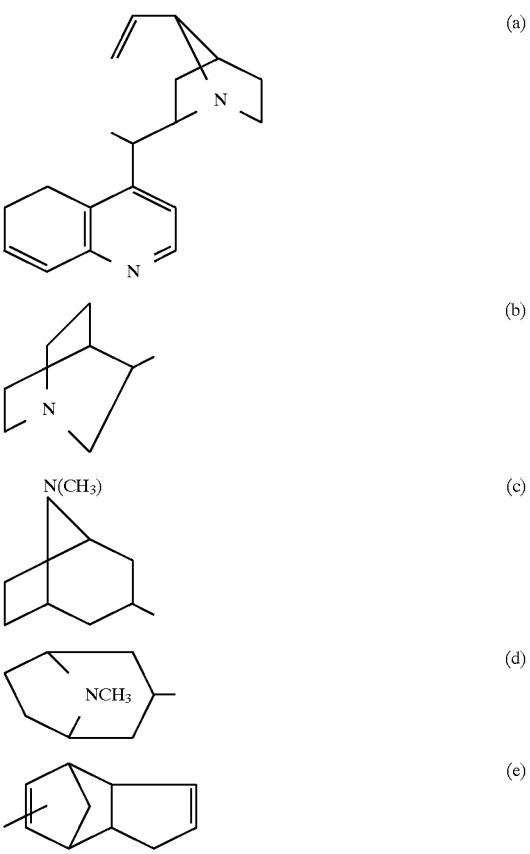

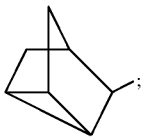

and k, l, m, and n are each an integer of 0 to 4, provided that k, l, m, and n are not 0 at the same time, and that when each of k, l, m and n is 3 or less, the other substituents for each benzene ring are a hydrogen atom or a halogen atom.

In the above-mentioned formula I-(III), examples of the metal represented by M are Al, Si, Ca, Cd, Ti, V, Mn, Fe, Co, Ni, Cu, Zn, Ge, Mo, Ru, Rh, Pd, In, Sn, Pt and Pb.

The phthalocyanine compound of formula I-(III) can be dissolved in organic solvents with high solubility, without losing its stability, and has high near-infrared absorption performance, and therefore can be used as a near-infrared absorption component for a near-infrared absorption material. Because of the above-mentioned advantages of this phthalocyanine compound, a thin film shaped near-infrared absorption material with high stability can be produced by a solvent coating method with high productivity. Such a near-infrared absorption material comprising the above phthalocyanine compound can be applied to a variety of electronic parts and devices, The phthalocyanine compound of the above formula I-(III) of the present invention can be prepared by a method comprising the step of allowing at least one of the previously mentioned phthalonitrile compounds represented by formula I-(I) or at least one of the previously mentioned diiminoisoindoline compounds represented by formula I-(II) to react with a metal or a metal derivative in an organic solvent:

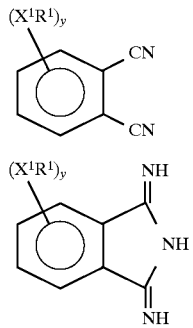

wherein $X^1$ is an oxygen atom or sulfur atom; $R^1$ is a cyclic substituent selected from the group consisting of the same cyclic substituents (a) to (f) as defined in the above-mentioned formula I-(III), and y is an integer of 1 or 2.

It is preferable that the synthesis of the above phthalocyanine ring be performed in an organic solvent. More specifically, at least one of the previously mentioned phthalonitrile compounds represented by formula I-(I) or at least one of the previously mentioned diiminoisoindoline compounds represented by formula I-(II) (namely 1 to 4 compounds) is allowed to react with a metal or a metal derivative in an organic solvent with the application of heat to the reaction mixture at a temperature of 90° C. to 240° C.

When the reaction temperature is below 90° C., the reaction proceeds too slowly or does not proceed, while when the reaction temperature is above 240° C., the yield of the product is decreased because of the formation of too much decomposed products.

It is preferable that the amount of the solvent used in this reaction be in the range of 1 to 100 parts by weight, more preferably in the range of 3 to 25 parts by weight to one part by weight of the phthalonitrile compound or the diiminoisoindoline compound. It is also preferable that the solvent for use in this reaction have a boiling point of 90° C. or more.

It is preferable that alcohol be employed as the solvent. Examples of the alcohol are n-butyl alcohol, n-amyl alcohol, n-hexanol, cyclohexanol, 2-methyl-1-pentanol, 1-heptanol, 2-heptanol, 1-octanol, 2-ethyl-hexanol, benzyl alcohol, ethylene glycol, propylene glycol, ethoxyethanol, propoxy ethanol, or butoxy ethanol.

Examples of the metal or metal derivative for use in the above reaction are Al, Si, Ca, Cd, Ti, V, Mn, Fe, Co, Ni, Cu, Zn, Ge, Mo, Ru, Rh, Pd, In, Sn, Pt, Pb, and halides thereof, carboxylic acid derivatives, sulfates, nitrates, carbonyl compounds, oxides and complexes of the above metals.

It is preferable that the molar ratio of the metal or metal derivative to the phthalonitrile compound or the diiminoisoindoline compound be in the range of 1:3 to 6.

As a catalyst for the reaction for the phthalocyanine ring formation, for instance, organic bases such as diazabicycloundecene and diazabicyclonene may be employed. It is preferable that such a catalyst be employed in an amount of 0.1 to 10 moles, more preferably in an amount of 0.5 to 2 moles, per one mole of the phthalonitrile compound or the diiminoisoindoline compound.

The phthalocyanine compound of formula I-(III) in which M represents two hydrogen atoms, which is a metal-free phthalocyanine compound, can be prepared by a method comprising the step of allowing at least one phthalonitrile compound represented by formula I-(I) or at least one diiminoisoindoline compound represented by formula I-(II) to react with lithium or sodium in an organic solvents:

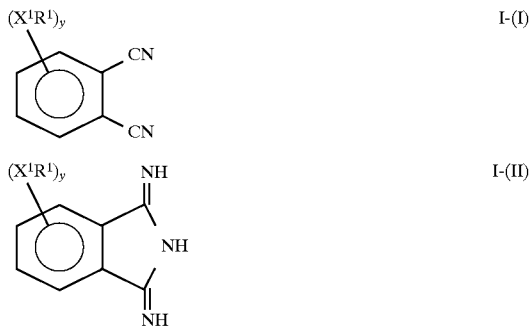

wherein $X^1$ is an oxygen atom or sulfur atom; $R^1$ is a cyclic substituent selected from the group consisting of said cyclic substituents (a) to (f), and y is an integer of 1 or 2.

It is preferable that the above reaction be carried out in an organic solvent, more preferably in an alcohol solvent. To be more specific, the phthalonitrile compound or the diiminoisoindoline compound is allowed to react with metal Li or Na in an alcohol solvent in the presence of $CH_3ONa$, NaH or butyl lithium at a temperature of 70° C. to 150° C. It is preferable that the amount of the metal Li or Na to be added be in the range of 0.5 to 4 moles to one mole of the phthalonitrile compound or the diiminoisoindoline compound. Specific examples of the alcohol solvent are the same as employed in the preparation of the previously mentioned metallo-phthalocyanine. The amount of the alcohol solvent to be used is also the same as in the case of the preparation of the previously mentioned metallo-phthalocyanine.

However, the reaction temperature is not more than 150° C. because when the reaction temperature exceeds 150° C., the amount of decomposed by-products formed in the course of the reaction is increased.

An optical information recording medium of the present invention comprises a substrate and a recording layer which is directly or via an undercoat layer provided on the substrate. When necessary, a protective layer is provided on the recording layer. In the recording layer, the above-mentioned phthalocyanine compound of formula I-(III) is contained.

An embodiment of the optical information recording medium of the present invention further comprises a metal reflection layer between the recording layer and the protective layer and constitutes a write-once type compact disk capable of recording CD format signals.

In the phthalocyanine compound for use in the present invention, the previously mentioned substituent represented by $X^1R^1)_y$, which is a sterically bulky substituent, is introduced into the benzene rings of the phthalocyanine skeleton, whereby the association of the molecules of the phthalocyanine compound is hindered, and high solubilities in organic solvents are attained.

Furthermore, when this phthalocyanine compound is employed in an optical information recording medium, there are attained high light absorption in the wavelengths shorter than the wavelengths for reproduction, and high reflectivity and high refractive index in the wavelengths for reproduction. Specifically, an information recording medium comprising the phthalocyanine compound is capable of exhibiting high refractive Index in 770–830 nm wavelengths, and high stability. Therefore, a CD-R recording medium fabricated by use of the phthalocyanine compound exhibits high reflectivity and has excellent stability with respect to the preservability and reproducibility. Furthermore, the CD-R recording medium exhibits high absorbance in the wavelength of 630 to 720 nm and high light reflection and therefore can be applied to a pick-up using a semiconductor laser with a wavelength of 630 to 720 nm. Therefore, in comparison with currently available recording media for 770 to 830 nm wavelengths, 1.5 to 1.8 times greater recording density can be attained.

Of the phthalocyanine compounds represented by formula I-(III), the phthalocyanine compound of formula I-(III) in which each of k, l, m and n is an integer of 1 or 2, one or two substituents are bonded to each benzene ring at the position 1 and/or 4, and the other substituents are a hydrogen atom or a halogen atom, preferably a bromine, is particularly preferable for use in the optical information recording medium. This is because the above phthalocyanine compound exhibits better molecule association inhibition effect, and when the phthalocyanine compound is used in the recording layer of the optical information recording medium, the wavelength of the light to be absorbed by the recording layer can be easily controlled, and the refractive index of the recording layer and the reflectivity thereof can be improved in a suitable manner for the optical information recording medium.

Specific examples of the phthalocyanine compound of the above formula I-(III) of the present invention are as shown in the following Table I-(2):

TABLE I-(2)

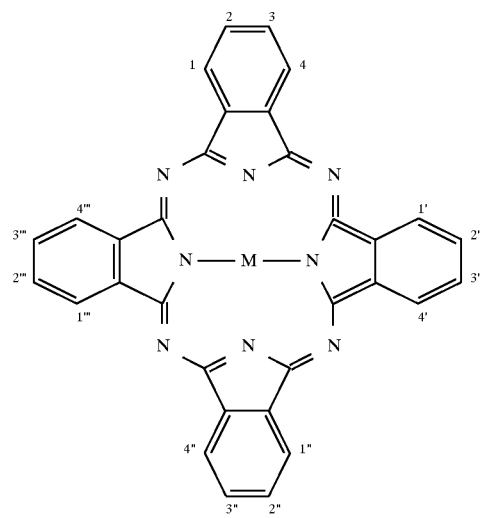

| Compound No. | M | 1~1''' | 2~2''' | 3~3''' | 4~4''' |
|---|---|---|---|---|---|
| I-1 | Cu | [NCH₃-bridged bicyclic]—O— | H | H | H |
| I-2 | Zn | [norbornyl]—S— | H | H | H |

TABLE I-(2)-continued

| Compound No. | M | 1~1''' | 2~2''' | 3~3''' | 4~4''' |
|---|---|---|---|---|---|
| I-3 | Ni | quinuclidinyl-O— | H | H | quinuclidinyl-O— |
| I-4 | Ni | quinuclidinyl-O— | Br | H | H |
| I-5 | Co | dicyclopentadienyl-O— | Cl | H | H |
| I-6 | VO | H | norbornyl-O— | H | H |
| I-7 | H$_2$ | (N-methyl-tropanyl)-O— | H | H | H |
| I-8 | Pt | quininyl (H$_2$C=CH-quinuclidinyl-CH(O—)-quinolinyl) | Cl | H | H |

TABLE I-(2)-continued

[Phthalocyanine macrocycle structure with central M, and four benzene rings labeled at positions 1-4, 1'-4', 1"-4", 1'"-4'"]

| Compound No. | M | 1~1'" | 2~2'" | 3~3'" | 4~4'" |
|---|---|---|---|---|---|
| I-9 | Pd | 1:Br<br>1", 1'": [bicyclic NCH₃ O— group]<br>1':H | 2": Br<br>2,2',2'": H | 3': Br<br>3,3",3'": H | 4'":Br<br>4, 4': [bicyclic NCH₃ O— group]<br>4": H |
| I-10 | OH–Si–OH | [dicyclopentadiene-type O— group] | H | H | H |
| I-11 | Si—(nC₆H₁₃)₃<br>O<br>Si<br>O<br>Si—(nC₆H₁₃)₃ | [norbornyl O— group] | H | H | H |
| I-12 | Cu | [norbornyl O— group] | H | H | H |
| I-13 | Fe | [norbornyl with NCH₃ and (CH₃)₃SiO, O— group] | H | H | H |
| I-14 | Cl–Sn–Cl | H | [quinuclidinyl O— group] | H | H |
| I-15 | Pb | H | [dicyclopentadiene-type O— group] | H | H |

TABLE I-(2)-continued
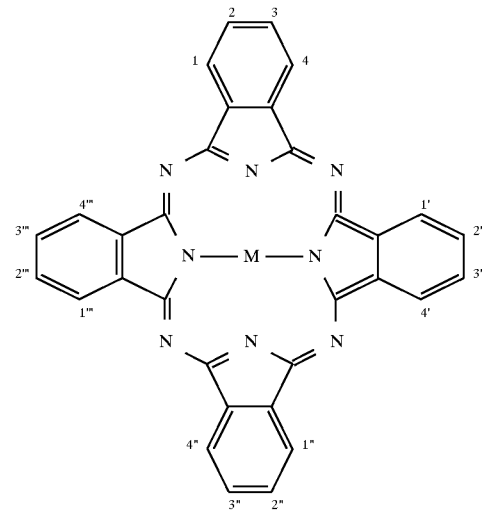
| Compound No. | M | 1~1''' | 2~2''' | 3~3''' | 4~4''' |
|---|---|---|---|---|---|
| I-16 | TiO | H | 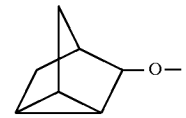 | H | H |
| I-17 | Ni | 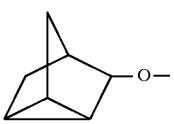 | F | H | H |
| I-18 | Co | 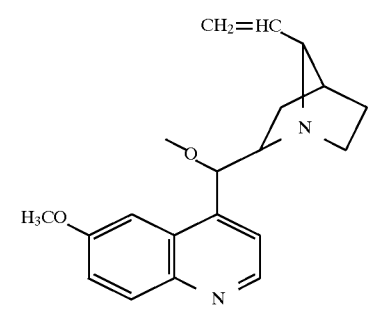 | H | H | H |
| I-19 | Cu | 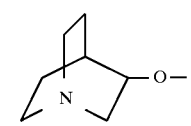 | H | H | H |
| I-20 | Zn | 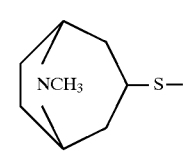 | H | H | H |
| I-21 | Ni | 1:Br<br>1'',1''': 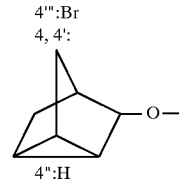<br>1':H | 2'':Br<br>2,2',2''': H | 3': Br<br>3,3'',3''': H | 4''':Br<br>4, 4':<br>4'':H |

The other phthalonitrile compound of the present invention has the following formula II-(I), which is also useful as an intermediate for producing a phthalocyanine compound for use in a near-infrared absorbing material:

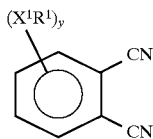

II-(I)

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via a methylene group; and y is an integer of 1 or 2.

Specific examples of the radical represented by $R^1$ are as shown in the following Table II-(1):

TABLE II-(1)

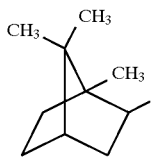 (1)

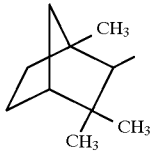 (2)

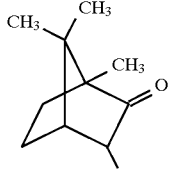 (3)

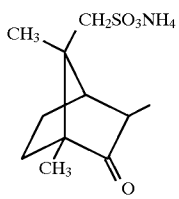 (4)

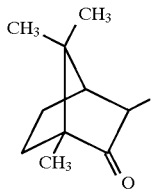 (5)

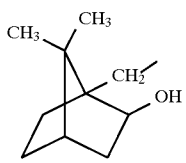 (6)

TABLE II-(1)-continued

 (7)

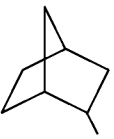 (8)

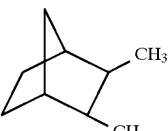 (9)

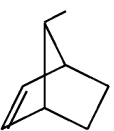 (10)

The above phthalonitrile compound of formula II-(I) can be prepared by a method comprising the step of allowing 3- or 4-nitrophthalonitrile to react with an alcohol derivative or mercaptan derivative having a radical selected from the group consisting of a bornane radical, a norbornane radical and a norbornene radical in an organic solvent in the presence of sodium hydride in accordance with the following reaction scheme II-A:

Reaction Scheme II-A

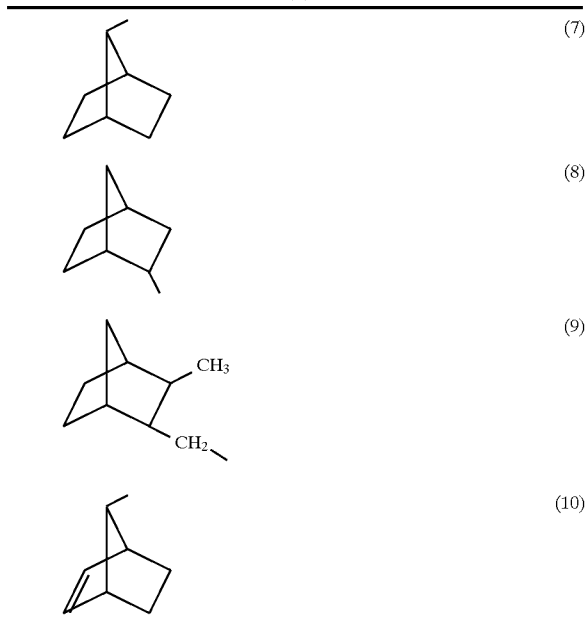

Specific examples of the alcohol derivative having one cyclic substituent and the mercaptan derivative having one cyclic substituent are the substituted alcohol derivatives and mercaptan derivatives as shown in the previously provided Table II-(1).

Specific examples of an organic solvent for use in the above reactions are N,N-dimethylformaldehyde, N,N-dimethylacetamide, 1-methyl-2-pyrrolidone and dimethyl sulfoxide. Of these organic solvents, N,N-dimethylformaldehyde and N,N-dimethylacetamide are particularly preferable for use in the present invention.

It is preferable that the amount of the above-mentioned alcohol derivative or mercaptan derivative be in the range of 0.1 to 2 moles, more preferably in the range of 0.8 to 1.2 moles, to 1 mole of the above-mentioned nitrophthalonitrile. The reaction temperature for the above reaction is in the range of –20° C. to 120° C., preferably in the range of –10° C. to 60° C.

A phthalonitrile compound of the above-mentioned formula II-(I), in which $X^1$ is an oxygen atom, can be prepared by a method comprising the step of allowing one component selected from the group consisting of 3-hydroxyphthalonitrile, 4-hydroxy-phthalonitrile and 2,3-dicyanohydroquinone to react with a halide having a radical selected from the group consisting of a bornane radical, a norbornane radical and a norbornene radical in an organic solvent in the presence of an alkali in accordance with the following reaction scheme II-B:

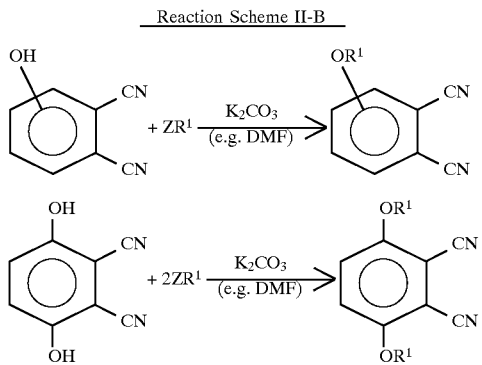

Reaction Scheme II-B wherein Z is a halogen atom.

More specifically, 3-hydroxyphthalonitrile, 4-hydroxyphthalonitrile or 2,3-dicyanohydroquinone is dissolved in an organic solvent, together with an alkali such as potassium carbonate or sodium hydroxide, and then is allowed to react with the above-mentioned halide, whereby the phthalonitrile compound of the above-mentioned formula II-(I), in which $X^1$ is an oxygen atom, can be prepared.

As the above-mentioned halide having the radical as the substituent, halides having any of the radicals shown in the previously mentioned Table II-(I) can be employed.

As the organic solvent for use in the reactions in the above reaction scheme II-b, the same organic solvents as employed in the preparation of the phthalonitrile compound of formula II-(I) in the previously mentioned reaction scheme II-A can be employed.

A diiminoisoindoline compound of the following formula II-(II) of the present invention is a novel compound and useful as an intermediate for producing a phthalocyanine compound for use in a near-infrared absorbing material:

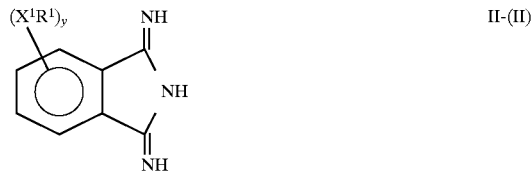

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via a methylene group; and y is an integer of 1 or 2.

Specific examples of the radicals in the above are the same radicals as shown in the previously provided Table II-(1).

The diiminoisoindoline compound of the following formula II-(II) of the present invention can be prepared by allowing any of phthalonitrile compounds represented by the above previously mentioned formula II-(I) to react with ammonia in an alcohol in the presence of metal sodium or sodium alkoxide in accordance with the following reaction scheme II-C:

Reaction Scheme II-C

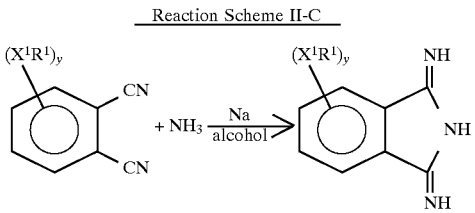

A representative example of the alcohol used as the solvent in the above reaction is methyl alcohol.

Another near-infrared absorbing material for use in the present invention comprises a phthalocyanine compound of the following formula II-(III), which is a novel compound:

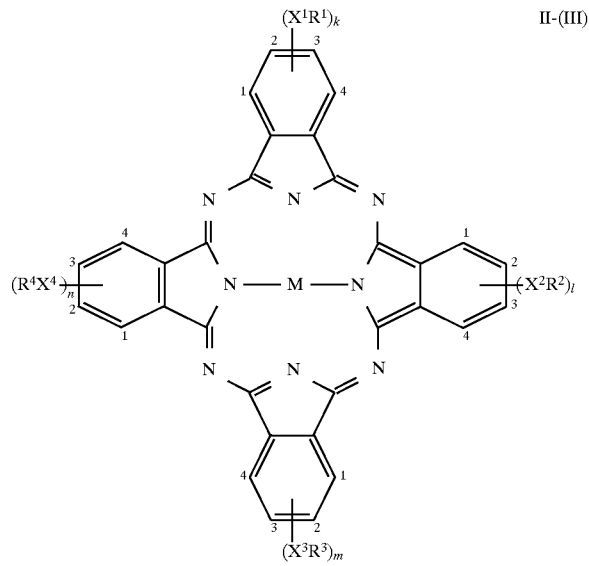

wherein M represents two hydrogen atoms, or a bivalent, trivalent or tetravalent metal which may have a halogen atom or an oxygen atom; $X^1$ to $X^4$ are each an oxygen atom or sulfur atom; $R^1$ to $R^4$ are each a radical selected from the group consisting of a bornane radical, a norbornane radical and a norbornene radical, each of which may have a substituent or may be bonded to $X^1$ via a methylene group; and k, l, m, and n are each an integer of 0 to 4, provided that k, l, m, and n are not 0 at the same time, and that when each of k, l, m, and n is 3 or less, the other substituents for each benzene ring are a hydrogen atom or a halogen atom.

In the above-mentioned formula II-(III), examples of the metal represented by M are Al, Si, Ca, Cd, Ti, V, Mn, Fe, Co, Ni, Cu. Zn, Ge, Mo, Ru, Rh, Pd, In, Sn, Pt and Pb.

The phthalocyanine compound of formula II-(III) can be dissolved in organic solvents with high solubility, without losing its stability, and has high near-infrared absorption performance, and therefore can be used as a near-infrared absorption component for a near-infrared absorption material. Because of the above-mentioned advantages of this phthalocyanine compound, a thin film shaped near-infrared absorption material with high stability can be produced by a solvent coating method with high productivity. Such a near-infrared absorption material comprising the above phthalocyanine compound can be applied to a variety of electronic parts and devices.

The phthalocyanine compound of the above formula II-(III) of the present invention can be prepared by a method comprising the step of allowing at least one of the previously mentioned phthalonitrile compounds represented by formula II-(I) or at least one of the previously mentioned diiminoisoindoline compounds represented by formula II-(II) to react with a metal or a metal derivative in an organic solvent:

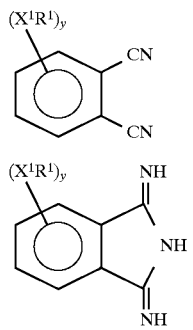

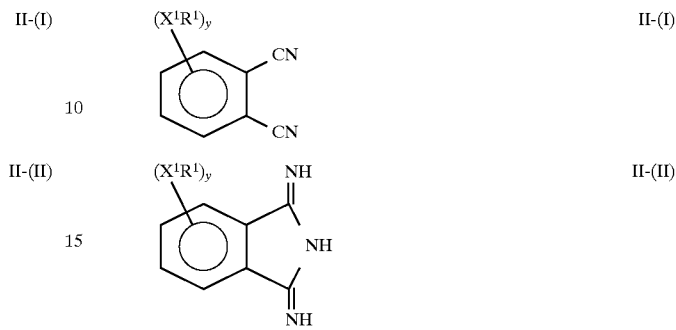

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via methylene group; and y is an integer of 1 or 2.

It is preferable that the synthesis of the above phthalocyanine ring be performed in an organic solvent. More specifically, at least one of the previously mentioned phthalonitrile compounds represented by formula II-(I) or at least one of the previously mentioned diiminoisoindoline compounds represented by formula II-(II) (namely 1 to 4 compounds) is allowed to react with a metal or a metal derivative in an organic solvent with the application of heat to the reaction mixture at a temperature of 90° C. to 240° C.

When the reaction temperature is below 90° C., the reaction proceeds too slowly or does not proceed, while when the reaction temperature is above 240° C., the yield of the product is decreased because of the formation of too much decomposed products.

It is preferable that the amount of the solvent used in this reaction be in the range of 1 to 100 parts by weight, more preferably in the range of 3 to 25 parts by weight to one part by weight of the phthalonitrile compound or the diiminoisoindoline compound. It is also preferable that the solvent for use in this reaction have a boiling point of 90° C. or more.

It is preferable that alcohol be employed as the solvent. Examples of the alcohol are n-butyl alcohol, n-amyl alcohol, n-hexanol, cyclohexanol, 2-methyl-1-pentanol, 1-heptanol, 2-heptanol, 1-octanol, 2-ethyl-hexanol, benzyl alcohol, ethylene glycol, propylene glycol, ethoxyethanol, propoxy ethanol, or butoxy ethanol.

Examples of the metal or metal derivative for use in the above reaction are Al, Si, Ca, Cd, Ti, V, Mn, Fe, Co, Ni, Cu, Zn, Ge, Mo, Ru, Rh, Pd, In, Sn, Pt, Pb, and halides thereof, carboxylic acid derivatives, sulfates, nitrates, carbonyl compounds, oxides and complexes of the above metals.

It is preferable that the molar ratio of the metal or metal derivative to the phthalonitrile compound or the diiminoisoindoline compound be in the range of 1:3 to 6.

As a catalyst for the reaction for the phthalocyanine ring formation, for instance, organic bases such as diazabicycloundecene and diazabicyclonene may be employed. It is preferable that such a catalyst be employed in an amount of 0.1 to 10 moles, more preferably in an amount of 0.5 to 2 moles, per one mole of the phthalonitrile compound or the diiminoisoindoline compound.

The phthalocyanine compound of formula II-(III) in which M represents two hydrogen atoms, which is a metal-free phthalocyanine compound, can be prepared by a method comprising the step of allowing at least one phthalonitrile compound represented by formula II-(I) or at least one diiminoisoindoline compound represented by formula II-(II) to react with lithium or sodium in an organic solvent:

wherein $X^1$ is an oxygen atom or sulfur atom; $R^1$ is a radical selected from the group consisting of a bornane radical, a norbornane radical and a norbornene radical, each of which may have a substituent or may be bonded to $X^1$ via methylene group; and y is an integer of 1 or 2.

It is preferable that the above reaction be carried out in an organic solvent, more preferably in an alcohol solvent. To be more specific, the phthalonitrile compound or the diiminoisoindoline compound is allowed to react with metal Li or Na in an alcohol solvent in the presence of $CH_3ONa$, NaH or butyl lithium at a temperature of 70° C. to 150° C. It is preferable that the amount of the metal Li or Na to be added be in the range of 0.5 to 4 moles to one mole of the phthalonitrile compound or the diiminoisoindoline compound. Specific examples of the alcohol solvent are the same as employed in the preparation of the previously mentioned metallo-phthalocyanine, The amount of the alcohol solvent to be used is also the same as in the case of the preparation of the previously mentioned metallo-phthalocyanine.

However, the reaction temperature is not more than 150° C. because when the reaction temperature exceeds 150° C., the amount of decomposed by-products formed in the course of the reaction is increased.

An optical information recording medium of the present invention comprises a substrate and a recording layer which is directly or via an undercoat layer provided on the substrate. When necessary, a protective layer is provided on the recording layer. In the recording layer, the above-mentioned phthalocyanine compound of formula II-(III) is contained.

An embodiment of the optical information recording medium of the present invention further comprises a metal reflection layer between the recording layer and the protective layer and constitutes a write-once type compact disk capable of recording CD format signals, In the phthalocyanine compound for use in the present invention, the previously mentioned substituent represented by $(X^1R^1)_y$, which is a sterically bulky substituent, is introduced into the benzene rings of the phthalocyanine skeleton, whereby the association of the molecules of the phthalocyanine compound is hindered, and high solubilities in organic solvents are attained.

Furthermore, when this phthalocyanine compound is employed in an optical information recording medium, there are attained high light absorption in the wavelengths shorter than the wavelengths for reproduction, and high reflectivity and high refractive index in the wavelengths for reproduction. Specifically, an information recording medium comprising the phthalocyanine compound is capable of exhibiting high refractive index in 770–830 nm wavelengths, and high stability. Therefore, a CD-R recording medium fabricated by use of the phthalocyanine compound exhibits high reflectivity and has excellent stability with respect to the preservability and reproducibility. Furthermore, the CD-R recording medium exhibits high absorbance in the wavelength of 630 to 720 nm and high light reflection and therefore can be applied to a pick-up using a semiconductor laser with a wavelength of 630 to 720 nm. Therefore, in comparison with currently available recording media for 770 to 830 nm wavelengths, 1.5 to 1.8 times greater recording density can be attained.

Of the phthalocyanine compounds represented by formula II-(III), the phthalocyanine compound of formula II-(III) in which each of k, l, m and n is an integer of 1 or 2, one or two substituents are bonded to each benzene ring at the position 1 and/or 4, and the other substituents are a hydrogen atom or a halogen atom, preferably a bromine, is particularly preferable for use in the optical information recording medium. This is because the above phthalocyanine compound exhibits better molecule association inhibition effect, and when the phthalocyanine compound is used in the recording layer of the optical information recording medium, the wavelength of the light to be absorbed by the recording layer can be easily controlled, and the refractive index of the recording layer and the reflectivity thereof can be improved in a suitable manner for the optical information recording medium.

Specific examples of the phthalocyanine compound of the above formula II-(III) of the present invention are as shown in the following Table II-(2):

TABLE II-(2)

| Compound No. | M | 1~1''' | 2~2''' | 3~3''' | 4~4''' |
|---|---|---|---|---|---|
| II-1 | Cu | [bornyloxy with CH3, CH3, CH3]—O— | H | H | H |
| II-2 | Zn | [bornyl with CH3, CH3]—CH2—S—[with OH] | H | H | H |
| II-3 | Ni | [bornyloxy with CH3, CH3, CH3]—O— | H | H | [bornyloxy with CH3, CH3, CH3]—O— |
| II-4 | Ni | [bornyloxy with CH3, CH3, CH3]—O— | Br | H | H |

TABLE II-(2)-continued

| Compound No. | M | 1~1''' | 2~2''' | 3~3''' | 4~4''' |
|---|---|---|---|---|---|
| II-5 | Co | (2-methyl-norbornyl-CH₂—O—) | Cl | H | H |
| II-6 | VO | H | (camphor-O—) | H | H |
| II-7 | H₂ | (2-methyl-norbornyl-CH₂—O—) | H | H | H |
| II-8 | Pt | (camphor-O—) | Cl | H | H |
| II-9 | Pd | 1:Br<br>1'',1''': (bornyl-O—)<br>1':H | 2'':Br<br>2,2',2''':H | 3':Br<br>3,3'',3''':H | 4''':Br<br>4,4': (bornyl-O—)<br>4'':H |
| II-10 | HO–Si–OH | (norbornenyl-CH₂—O—) | H | H | H |

TABLE II-(2)-continued
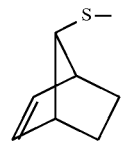
| Compound No. | M | 1~1''' | 2~2''' | 3~3''' | 4~4''' |
|---|---|---|---|---|---|
| II-11 | Si—(nC$_6$H$_{13}$)$_3$<br>\|<br>O<br>\|<br>Si<br>\|<br>O<br>\|<br>Si—(nC$_6$H$_{13}$)$_3$ | 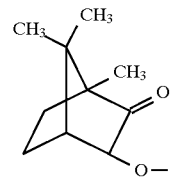 | H | H | H |
| II-12 | Cu | 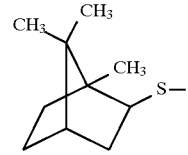 | H | H | H |
| II-13 | Fe | 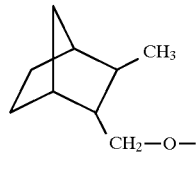 | H | H | H |
| II-14 | Cl<br>\|<br>Sn<br>\|<br>Cl | H | 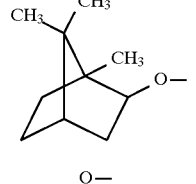 | H | H |
| II-15 | Pb | H | 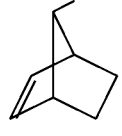 | H | H |
| II-16 | TiO | H |  | H | H |

TABLE II-(2)-continued

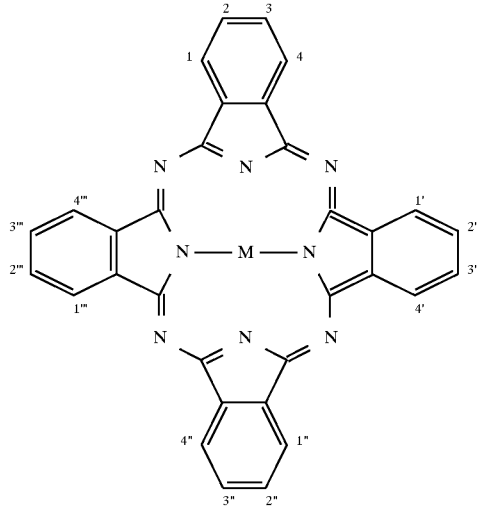

| Compound No. | M | 1~1''' | 2~2''' | 3~3''' | 4~4''' |
|---|---|---|---|---|---|
| II-17 | Ni | 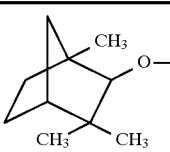 | F | H | H |
| II-18 | Co | 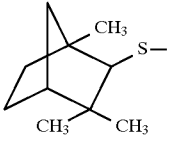 | H | H | H |
| II-19 | Cu | 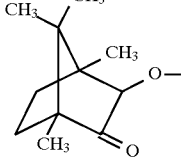 | H | H | H |
| II-20 | Zn | 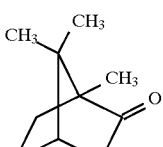 | H | H | H |
| II-21 | Ni | 1:Br<br>1'', 1''' :<br>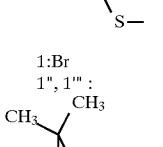<br>1':H | 2'': Br<br>2,2',2''': H | 3': Br<br>3,3'',3''': H | 4''':Br<br>4, 4':<br>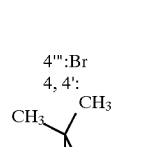<br>4'':H |

The structures of the optical information recording media of the present invention will now be explained with reference to FIG. 1(a) to FIG. 1(d) and FIG. 2(a) to FIG. 2(b).

FIG. 1(a) is a schematic cross-sectional view of an optical information recording medium of the present invention, which comprises a substrate 1 and a recording layer 2 provided on the substrate 1.

FIG. 1(b) is a schematic cross-sectional view of another optical information recording medium of the present invention, which is the same as the optical information recording medium as shown in FIG. 1(a) except that an undercoat layer 3 is interposed between the substrate 1 and the recording layer 2.

FIG. 1(c) is a schematic cross-sectional view of a further optical information recording medium of the present invention, which is the same as the optical information recording medium as shown in FIG. 1(a) except that a protective layer 4 is provided an the recording layer 2.

FIG. 1(d) is a schematic cross-sectional view of still another optical information recording medium of the present invention, which is the same as the optical information recording medium as shown in FIG. 1(c) except that an undercoat layer 3 is interposed between the substrate 1 and the recording layer 2.

Each of FIG. 2(a) and FIG. 2(b) shows optical information recording media of the present invention which are of a different type from the type of the optical information recording media shown in FIGS. 1(a) to 1(d), in the sense that a metal reflection layer 5 is provided on the recording layer 2.

More specifically, FIG. 2(a) is a schematic cross-sectional view of an optical information recording medium of the present invention, which comprises a substrate 1, a recording layer 2 provided on the substrate 1, a metal reflection layer 5 provided on the recording layer 2, and a protective layer 4 on the metal reflection layer 5.

FIG. 2(b) is a schematic cross-sectional view of another optical information recording medium of the present invention, which is the same as the optical information recording medium as shown in FIG. 2(a) except that an undercoat layer 3 is interposed between the substrate 1 and the recording layer 2.

According to the present invention, a still further optical information recording medium may be constructed in a sealed air-sandwich structure, which is composed of a pair of any of the above-mentioned optical information recording media which are affixed in such a manner that each of the recording layers comes inside between the two substrates with a certain space therebetween.

The properties required for each of the above-mentioned mentioned substrate, recording layer, undercoat layer, metal reflection layer and protective layer for use in the optical information recording media of the present invention will now be explained.

(1) Substrate

When recording and reproduction are carried out from the substrate side, it is required that the substrate be transparent to the laser beam employed for the recording and reproduction. Such transparency is unnecessary when recording and reproduction are carried out from the recording layer side.

Examples of the material for the substrate are plastics such as polyester, acrylic resin, polyamide, polycarbonate resin, polyolefin resin, phenol resin, epoxy resin, polyimide; glass; ceramics, and metals. Guide grooves or guide bits for tracking may be formed on the surface of the substrate. Furthermore, preformats for address signals and the like may also be formed on the surface of the substrate.

(2) Recording layer

Information is recorded in the recording layer by forming some optical changes in the recording layer by the recording layer being irradiated with laser beams. According to the present invention, it is required that any of the phthalocyanine compounds of formula I-(III) or formula II-(III) be contained in this recording layer. These phthalocyanine compounds may be used alone or in combination.

The phthalocyanine compounds may also be employed in combination with dyes such as polymethine dyes, naphthalocyanine dyes, squarylium dyes, croconium dyes, pyrylium dyes, naphthoquinone dyes anthraquinone (indanthrene) dyes, xanthene dyes, triphenylmethane dyes, azulene dyes, tetrahydrocholine dyes, phenanthrene dyes, triphenothiazine dyes, or metal complex compounds. These dyes and metal complex compounds may be used alone or in combination.

The phthalocyanine compounds of the present invention can also be employed in combination with a metal such as In, Al, Te, Bi, Be, As, or Cd, or a metal compound such as $TeO_2$ or SnO, in the form of a dispersed mixture or in the form of overlaid layers.

The phthalocyanine compounds of the present invention can also employed in combination with various materials, for example, polymers such as ionomer resin, polyamide resin, polyvinyl resin, natural polymers, silicone and liquid rubber, and a silane coupling agent, in the form of a dispersed mixture.

Furthermore, in order to improve the characteristics of the phthalocyanine compounds, the phthalocyanine compounds may also be employed in combination with other agents such as a stabilizer (for example, a transition metal complex), a dispersant, a fire retardant, a lubricant, an antistatic agent, a surfactant, and a plasticizer.

The recording layer can be formed by any of conventional methods such as sputtering, CVD and solvent coating.

The coating method is carried out by dissolving any of the phthalocyanine compounds in an organic solvent to prepare a solution of the phthalocyanine compound, and a recording layer is formed by coating, for instance, the substrate with the solution by a conventional coating method such as spray coating, roller coating, dipping, or spinner coating.

Specific examples of the organic solvent are alcohols such as methanol, ethanol and isopropanol; ketones such as acetone, methyl ethyl ketone and cyclohexanone; amides such as N,N-dimethylacetamide and N,N-dimethylformamide; sulfoxide such as dimethyl-sulfoxide; ethers such as tetrahydrofuran, dioxane, diethyl ether and ethylene glycol monomethyl ether; esters such as methyl acetate and ethyl acetate; aliphatic carbon halides such as chloroform, methyl chloride, dichloroethane, carbon tetra-chlride and trichloroethane; aromatic compounds such as benzene, xylene, monochlorobenzene and dichlorobenzene; and hydrocarbons such as hexane, pentane, cyclohexane and methylcyclohexane.

It is preferable that the recording layer for the optical information recording media as shown in FIGS. 1(a) to 1(d) have a thickness in the range of 100 Å to 10 μm, more preferably in the range of 200 Å to 1000 Å, while in the case of the optical information recording media as shown in FIGS. 2(a) and 2(b), it is preferable that the thickness of the recording layer be in the range of 300 Å to 5 μm, more preferably in the range of 500 Å to 2000 Å.

(3) Undercoat layer

The undercoat layer is formed between the substrate and the recording layer for the following purposes: (a) improving the adhesion strength between the substrate and the recording layer; (b) preventing the recording layer from being exposed to water and gases as a barrier layer; (c) improving the preservation stability of the recording layer; (d) increasing the reflectance of the recording layer; (e) protecting the substrate from the solvent employed; and (f) forming guide grooves, guide pits and pregrooves and the like.

To attain the above-mentioned purpose (a), a variety of polymeric materials such as ionomer resin, polyamide resin, vinyl resin, natural resins, natural polymeric materials, silicone and liquid rubber; and a silane coupling agent may be employed.

To attain the purposes (b) and (c), inorganic compounds such as $SiO_2$, $MgF_2$, SiO, $TiO_2$, ZnO, TiN and SiN; and metals such as Zn, Cu, Ni, Cr, Ge, Se, Au, Ag and Al and semimetals can be used in addition to the above-mentioned polymeric materials.

To attain the purpose (d), a metal such as Al or Ag may be used in the undercoat layer; or an organic thin film exhibiting metallic luster which comprises, for example, methine dye or xanthene dye, can be used as the undercoat layer.

To attain the purposes (e) and (f), an ultraviolet-curing resin, a thermosetting resin and a thermoplastic resin can be used in the undercoat layer.

It is preferable that the undercoat layer have a thickness in the range of 0.01 to 30 μm, more preferably in the range of 0.05 to 10 μm.

(4) Metal Reflection Layer

The metal reflection layer for use in the present invention can be made of a metal made of a single substance which has high reflectivity and is difficult to be corroded.

Specific examples of the metal are Au, Ag, Cu, Al, Cr and Ni. Of these metals, Au and Al are particularly preferable for use in the present invention. These metals can be used alone or in combination, or in the form of alloys. A semimetal such as As, Sb and Bi can also be used in combination or in the form of alloys with any of the above-mentioned metals.

The metal reflection layer can be formed by a conventional film formation method such as vacuum deposition or sputtering. It is preferable that the metal reflection layer have a thickness in the range of 50 to 3000 Å, more preferably in the range of 100 to 1000 Å.

(5) Protective layer

The protective layer is used (a) to protect the recording layer from damage, dust, soiling and the like, (b) to improve the storage stability of the recording layer, (c) to improve the reflectivity, and (d) to protect the opposite surface of the substrate to the recording layer from damage, dust, soiling and the like in the form of a hard coat layer.

For these purposes, the same materials as used for the undercoat layer can be used in the protective layer. to meet the above objects.

As inorganic materials, for instance, SiO and $SiO_2$ can be employed. As organic materials, there can be employed heat-softening or heat-fusible resins such as acrylic resin, polycarbonate, epoxy resin, polystyrene, polyester resin, vinyl resin, cellulose, aliphatic hydrocarbon resin, aromatic hydrocarbon resin, natural rubber, styrene - butadiene resin, chloroprene rubber, wax, alkyed resin, drying oil, rosin, and ultraviolet-curing resin.

Of the above-mentioned resins, ultraviolet-curing resin is most preferable for use in the protective layer, since the ultraviolet-curing resin is excellent in productivity.

It is preferable that the protective layer have a thickness in the range of 0.01 to 30 μm, more preferably in the range of 0.05 to 10 μm.

In the present invention, auxiliary agents such as a stabilizer, a dispersant, a fire retardant, a lubricant, an antistatic agent, a surfactant, and a plasticizer can be contained in the above-mentioned undercoat layer and protective layer in the same manner as in the case of the recording layer.

The features of the present invention will become apparent in the course of the following description of exemplary embodiments, which are given for illustration of the invention and are not intended to be limiting thereof.

EXAMPLE I-1

[Fabrication of optical information recording medium]

A guide groove with a depth of 1000 Å, a half width of 0.4 μm and a track pitch of 1.4 μm was formed on a photopolymer provided on a polymethyl methacrylate disk with a thickness of 1.2 μm, so that a substrate was prepared.

The phthalocyanine compound No. I-1 of the present invention as shown in Table I-(2) was dissolved in 1,2-dichloroethane, and the thus obtained solution of the phthalocyanine compound was applied to the above prepared substrate by spinner coating, so that a recording layer with a thickness of 800 Å was provided on the substrate.

Thus, an optical information recording medium No. I-1 according to the present invention was fabricated.

EXAMPLES I-2 to I-6

[Fabrication of optical information recording media]

The procedure for fabrication of the optical information recording medium No. I-1 in Example I-1 was repeated except that the phthalocyanine compound No. I-1 used as the recording material in Example I-1 was replaced by phthalocyanine compounds No. I-6, No. I-10, No. I-12, No. I-18 and No. I-20 shown in Table I-(2), respectively in Examples I-2, I-3, I-4, I-5 and I-6.

Thus, optical information recording media Nos. I-2 to I-6 according to the present invention were fabricated.

Comparative Example I-1

[Fabrication of optical information recording medium]

The procedure for fabrication of the optical information recording medium No. I-1 in Example I-1 was repeated except that the phthelocyanine compound No. I-1 used as the recording material in Example I-1 was replaced by a phthalocyanine compound represented by the following formula:

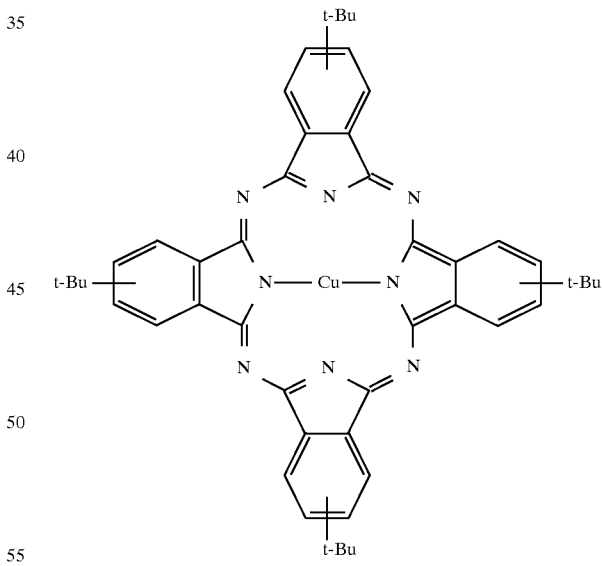

In practice, the employed phthalocyanine compound included isomers in which tert-butyl (t-Bu) is bonded to each benzene ring at the positions 2 and 3 in the above formula.

Thus, a comparative optical information recording medium No. I-1 was fabricated.

To evaluate the recording characteristics of each of the above prepared optical information recording media Nos. I-1 to I-6 according to the present invention and comparative optical information recording medium No. I-1, information was recorded by applying a laser beam with a wavelength of 680 nm to the substrate side of each recording medium, under the conditions that the recording frequency was 1.25 MHz, the linear speed was 2.1 m/sec, and N.A. of the pick-up lens was 0.5.

Using the same laser as employed in the above, a continuous wave laser beam having an intensity of 0.25 to 0.3 mW was applied to each recording medium to reproduce the recorded information, and the light reflected from the recording medium was detected. The detected light was subjected to a spectral analysis, using a scanning filter at a band width of 30 kHz, so that the initial C/N (carrier/noise) ratio was obtained.

Further, the reflectance (initial value) of a non-recorded portion on the guide groove was also measured by using the same laser beams.

The results are shown in Table I-(3).

In addition to the above, each recording medium was caused to deteriorate by exposing it to xenon lamp of 35,000 lux for 300 hours. After exposure, the reflectance and the C/N ratio of each recording medium were measured in the same manner as in the above. The results are also shown in Table I-(3).

TABLE I-(3)

|  | Initial Value | | After Exposure to Light for 300 Hours | |
| --- | --- | --- | --- | --- |
|  | Reflectance (%) | C/N (dB) | Reflectance (%) | C/N (dB) |
| Ex. I-1 | 26 | 49 | 25 | 49 |
| Ex. I-2 | 25 | 47 | 25 | 47 |
| Ex. I-3 | 27 | 48 | 26 | 48 |
| Ex. I-4 | 25 | 48 | 25 | 47 |
| Ex. I-5 | 23 | 47 | 23 | 46 |
| Ex. I-6 | 24 | 46 | 23 | 46 |
| Comp. Ex. I-1 | 13 | 34 | 13 | 33 |

EXAMPLE I-7

[Fabrication of optical Information recording medium]

The phthalocyanine compound No. I-4 of the present invention as shown in Table I-(2) was dissolved in a mixed solvent of 2-ethoxyethanol, 1,2-dichloroethane and tetrahydrofuran at a mixing ratio by weight of 8:1.5:0.5.

The thus obtained solution of the phthalocyanine compound was applied to a polycarbonate substrate with a thickness of 1.2 μm by spinner coating, on which substrate a guide groove with a depth of 1000 Å, a half width of 0.45 arm and a track pitch of 1.6 μm was formed by injection molding, so that a recording layer with a thickness of 1800 Å was provided on the substrate.

Thereafter, Au was vacuum-deposited on the above prepared recording layer, so that a metal reflection layer with a thickness of 1200 Å was provided on the recording layer.

Then, an acrylic photopolymer was applied to the above prepared metal reflection layer by spinner coating, and subjected to ultraviolet curing treatment, so that a protective layer was provided on the metal reflection layer.

Thus, an optical information recording medium No. I-7 of a CD-R type according to the present invention was fabricated.

EXAMPLES I-8 to I-11

[Fabrication of optical information recording media]

The procedure for fabrication of the optical information recording medium No. I-7 in Example I-7 was repeated except that the phthalocyanine compound No. I-4 used as the recording material in Example I-7 was replaced by phthalocyanine compounds No. I-1, No. I-2, No. I-9, and No. I-21 shown in Table I-(2), respectively in Examples I-8, I-9, I-10, and I-11.

Thus, optical information recording media Nos. I-8 to I-11 according to the present invention were fabricated.

Comparative Example I-2

[Fabrication of optical information recording medium]

The procedure for fabrication of the optical information recording medium No. I-7 in Example I-7 was repeated except that the phthalocyanine compound No. I-4 used as the recording material in Example I-7 was replaced by the same phthalocyanine compound as employed in Comparative Example I-1.

Thus, a comparative optical information recording medium No. I-2 was fabricated.

Comparative Example I-3

[Fabrication of optical information recording medium]

The procedure for fabrication of the optical information recording medium No. I-7 in Example I-7 was repeated except that the phthalocyanine compound No. I-4 used as the recording material in Example I-7 was replaced by a compound of the following formula:

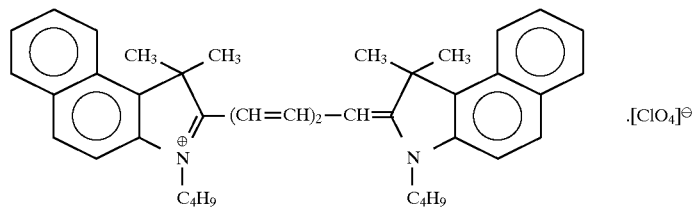

Thus, a comparative optical information recording medium No. I-3 was fabricated.

Comparative Example I-4

[Fabrication of optical information recording medium]

The procedure for fabrication of the comparative optical information recording medium No. I-3 in Comparative Example I-3 was repeated except that the compound used as the recording material in Comparative Example I-3 was replaced by a mixture prepared by adding a nickel complex compound of the following formula to the above-mentioned compound employed in Comparative Example I-3 at a ratio by weight of 10:100:

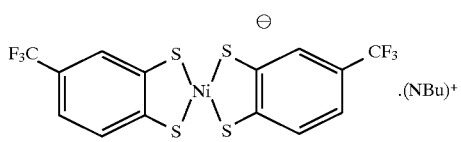

Thus, a comparative optical information recording medium No. I-4 was fabricated.

To evaluate the recording characteristics of each of the above prepared optical information recording media Nos. I-7 to I-11 according to the present invention and comparative optical information recording media Nos. I-2 to I-4, EFM signals were recorded by applying a laser beam with a wavelength of 790 nm to the substrate side of each recording medium at a linear speed of 1.4 m/sec. Then, the number of $C_1$ errors at the optimal power was measured.

In addition, the reflectance of a non-recorded portion of the recording medium was measured.

The results are shown in Table I-(4).

Furthermore, each recording medium was caused to deteriorate by exposing it to xenon lamp of 35,000 lux for 300 hours. After exposure, the reflectance and the number of $C_1$ errors of each recording medium were measured in the same manner as in the above. The results are also shown in Table I-(4).

TABLE 1-(4)

| | Initial Value | | After Exposed to Light of 35,000 lux for 300 Hours | |
|---|---|---|---|---|
| | Reflectance (%) | Number of C1 Errors | Reflectance (%) | Number of C1 Errors |
| Ex. I-7 | 69 | 6 | 69 | 6 |
| Ex. I-8 | 70 | 8 | 67 | 8 |
| Ex. I-9 | 68 | 19 | 66 | 20 |
| Ex. I-10 | 71 | 5 | 70 | 5 |
| Ex. I-11 | 70 | 5 | 69 | 5 |
| Comp. Ex. I-2 | 32 | >3000 | 30 | >3000 |
| Comp. Ex. I-3 | 73 | 3 | 15 | >3000 |
| Comp. Ex. I-4 | 72 | 5 | 40 | >2000 |

Synthesis Example II-1

[Synthesis of a phthalonitrile compound]

15 g (97.2 mmol) of (±)borneol was dissolved in 80 ml of dry DMF in an atmosphere of argon. The temperature of the above mixture was kept at 5° C. in an ice bath. To this mixture, 3.89 g (97.2 mmol) of 60% sodium hydride was added. Furthermore, a solution prepared by dissolving 16.82 g (97.2 mmol) of 3-nitrophthalonitrile in DMF was gradually added dropwise to the above obtained mixture.

After the completion of the addition, the ice bath was removed, and the reaction mixture was stirred at room temperature for 36 hours. The thus obtained reaction mixture was poured into 400 ml of diluted hydrochloric acid, and extracted with about 1 l of toluene. The resultant toluene layer was thoroughly washed with water. With the addition of an appropriate amount of magnesium sulfate, the toluene layer was stirred, allowed to stand for drying, and filtered. From thus obtained filtrate, toluene was distilled away.

The resultant residue was chromatographed on silica gel and eluted with toluene, whereby crystals were obtained. The obtained crystals were successively washed with methanol and hexane, and then dried, whereby a phthalonitrile compound according to the present invention, represented by the following formula (a), was obtained as white crystals in a yield of 23.48 g (86.2%):

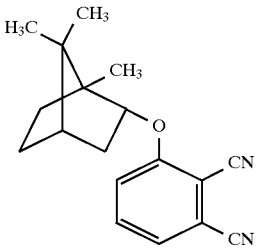

(a)

The results of the elemental analysis of the thus obtained product were as follows:

| | %C | %H | %N | %O |
|---|---|---|---|---|
| Found | 77.38 | 7.01 | 10.21 | 5.40 |
| Calculated | 77.14 | 7.14 | 10.0 | 5.71 |

FIG. 3 is an infrared spectrum of the thus obtained phthalonitrile compound.

Synthesis Example II-2

[Synthesis of phthalonitrile compound]

25 g (162.07 mmol) of 1,3,3-trimethylnorbornane-2-ol was dissolved in 120 ml of dry DMF in an atmosphere of argon. The temperature of the above mixture was kept at 5° C. in an ice bath. To this mixture, 6.48 g (162.07 mmol) of 60% sodium hydride was added. Furthermore, a solution prepared by dissolving 28.04 g (162.07 mmol) of 3-nitrophthalonitrile in DMF was gradually added dropwise to the above obtained mixture.

After the completion of the addition, the ice bath was removed, and the reaction mixture was stirred at room temperature for 43 hours. The thus obtained reaction mixture was poured into 400 ml of diluted hydrochloric acid, and extracted with about 1 l of toluene. The resultant toluene layer was thoroughly washed with water. With the addition of magnesium sulfate in an appropriate amount, the toluene layer was stirred, allowed to stand, and filtered. From the filtrate, toluene was distilled away.

The resultant residue was chromatographed on silica gel and eluted with toluene, whereby crystals were obtained. The obtained crystals were successively washed with methanol and hexane, and then dried, whereby a phthalonitrile compound according to the present invention, represented by the following formula (b), was obtained as white crystals in a yield of 37.18 g (81.9%):

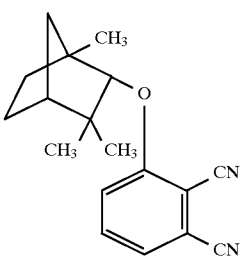

(b)

The results of the elemental analysis of the thus obtained product were as follows:

| | %C | %H | %N | %O |
|---|---|---|---|---|
| Found | 77.41 | 7.00 | 10.01 | 5.49 |
| Calculated | 77.14 | 7.14 | 10.0 | 5.71 |

Figure 4:
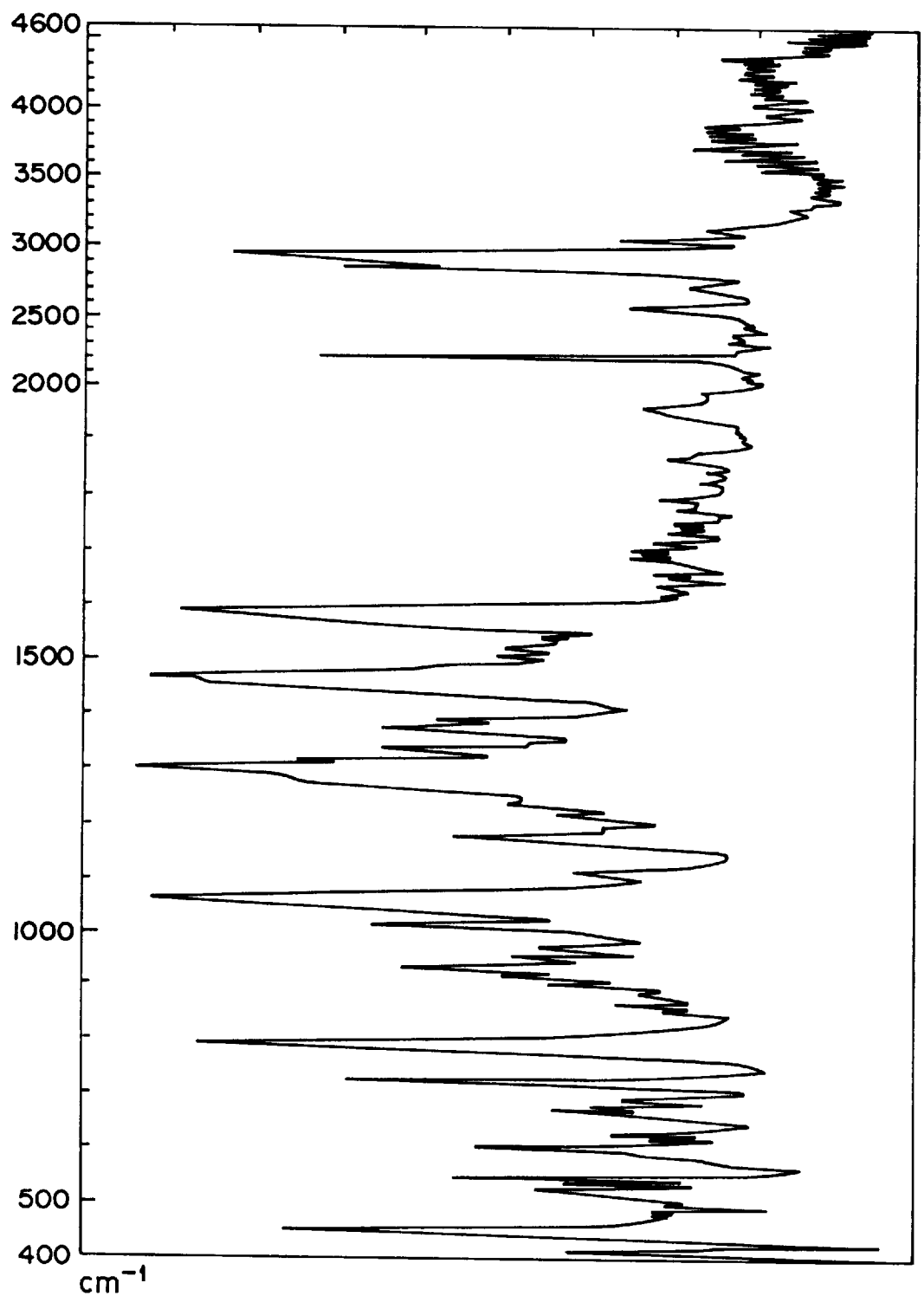
FIG. 4 is an infrared spectrum of a phthalonitrile compound of the present invention obtained in Synthesis Example II-2.

FIG. 4 is an infrared spectrum of the thus obtained phthalonitrile compound.

Synthesis Example II-3

[Synthesis of phthalonitrile compound]

15 g (93.75 mmol) of 2,3-dicyanohydroquinone and 12.95 g (93.75 mmol) of potassium carbonate were dissolved in N,N-dimethylacetamide under application of heat thereto. To this mixture, 43.4 g (93.75×2 mmol) of α-3-bromocamphor was added at 40° C. in an atmosphere of argon. The temperature of this mixture was raised to temperature in the range of 70° to 80° C., and the mixture was stirred for 30 hours.

After the reaction mixture was cooled to room temperature, the reaction mixture was poured into 500 ml of 0.7N hydrochloric acid, and extracted with 1.3 l of chloroform. The resultant chloroform layer was thoroughly washed with water, dried over magnesium sulfate, and chromatographed on silica gel and eluted with chloroform, whereby a phthalonitrile compound according to the present invention, represented by the following formula (c), was obtained as white crystals in a yield of 31.48 g (57.7%):

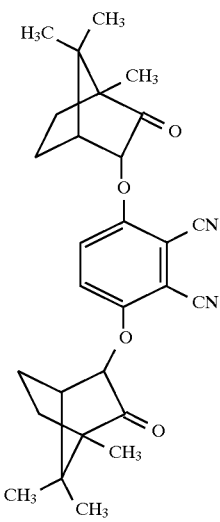
(c)

The results of the elemental analysis of the thus obtained product were as follows:

| | %C | %H | %N | %O |
|---|---|---|---|---|
| Found | 73.14 | 6.79 | 6.00 | 14.07 |
| Calculated | 73.04 | 6.96 | 6.08 | 13.92 |

Synthesis Example II-4

[synthesis of diiminoisoindoline compound]

10 g (35.7 mmol) of the phthalonitrile compound of formula (a) obtained in Synthesis Example II-1 and 3.86 g (35.7×2 mmol) of sodium methoxide were added to dry methanol. This reaction mixture was stirred at room temperature for 1 hour, with an ammonia gas being bubbled through the mixture. Then, the reaction mixture was refluxed as ammonia gas was bubbled into the reaction mixture.

After the reaction mixture was cooled to room temperature, the methanol was distilled away from the reaction mixture, thereby obtaining a precipitate. The precipitate thus obtained was thoroughly washed with water, so that a diiminoisoindoline compound according to the present invention, represented by the following formula (d), was obtained in a yield of 10.1 g (95.5%):

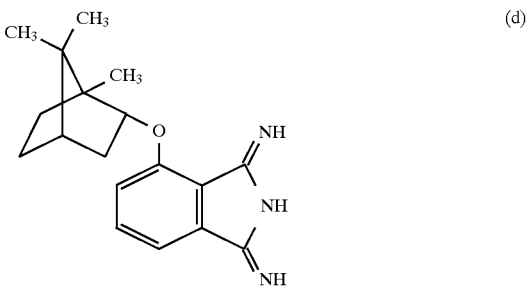
(d)

The results of the elemental analysis of the thus obtained product were as follows:

| | %C | %H | %N | %O |
|---|---|---|---|---|
| Found | 72.59 | 7.08 | 14.68 | 5.65 |
| Calculated | 72.97 | 7.43 | 14.19 | 5.41 |

Synthesis Example II-5

[Synthesis of phthalonitrile compound]

20 g of 4-hydroxyphthalonitrile and 10.55 g of potassium carbonate were dissolved in 180 ml of DMF under application of heat thereto. To this mixture, 32.1 g of α-3-bromocamphor was added at 35° C. in an atmosphere of argon. The temperature of this mixture was raised to temperature in the range of 65° to 80° C., and the mixture was stirred for 38 hours.

After the reaction mixture was cooled, the reaction mixture was poured into 400 ml of diluted hydrochloric acid, and extracted with 1.5 l of toluene. The resultant toluene layer was thoroughly washed with water, and dried over magnesium sulfate. The toluene was distilled away from the toluene layer.

Then, the resultant residue was chromatographed on silica gel and eluted with toluene, whereby a phthalonitrile compound according to the present invention, represented by the following formula (e), was obtained as white crystals in a yield of 29.8 g (50.7%):

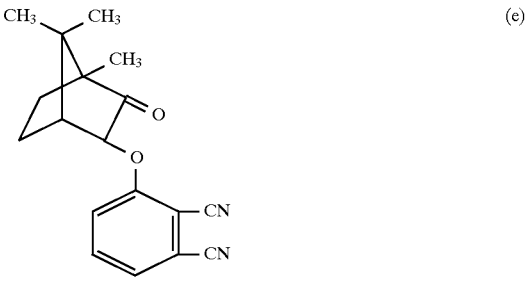
(e)

The results of the elemental analysis of the thus obtained product were as follows:

| | %C | %H | %N | %O |
|---|---|---|---|---|
| Found | 80.98 | 4.28 | 6.72 | 8.02 |
| Calculated | 81.16 | 4.35 | 6.76 | 7.73 |

Synthesis Example II-6

[Synthesis of phthalocyanine compound]

In an atmosphere of argon, 8 g (28.6 mmol) of the phthalonitrile compound of formula (a) obtained in Synthesis Example II-1 was dissolved in a mixture of 22 g of n-pentanol and 3.04 g (28.6×0.7 mmol) of diazabicycloundecene under the application of heat thereto. With the addition of 1.27 g (286/4 mmol) of palladium(II) chloride, the obtained reaction mixture was stirred at temperature in the range of 120° to 130° C. for 30 hours.

After the reaction mixture was cooled to room temperature, toluene was added to the reaction mixture. The materials insoluble in toluene were removed by filtration, and then the toluene was distilled away from the filtrate.

300 ml of methanol was added to the resultant residue, whereby crystals separated out. The crystals were obtained by filtration and washed with methanol, and then dried. Thereafter, the crystals were chromatographed on silica gel and eluted with a mixed solvent of toluene and hexane with a ratio by volume of 8:2.

Thus, a mixture of phthalocyanine compounds according to the present invention, represented by the following formulae (f1), (f2), (f3) and (f4) with a ratio by weight of 15:75:5:5, was obtained as dark green crystals in a yield of 4.86 g (55.54%):

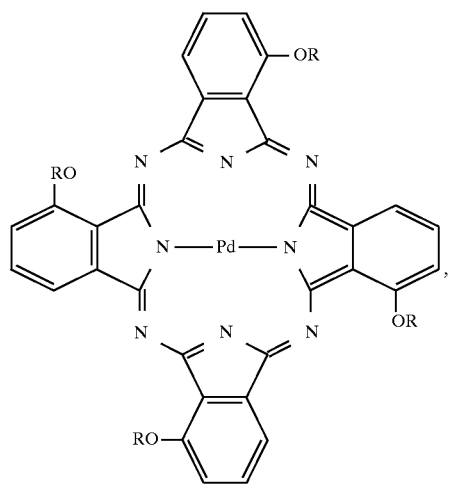

(f1)

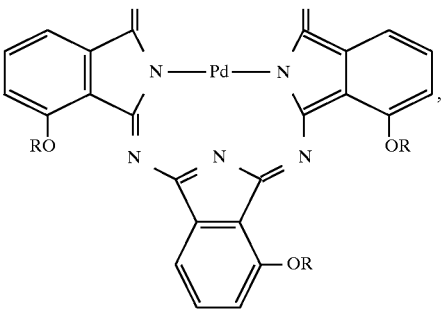

(f2)

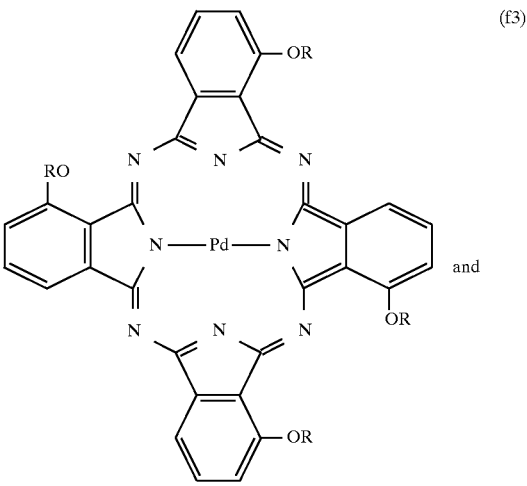

(f3)

and

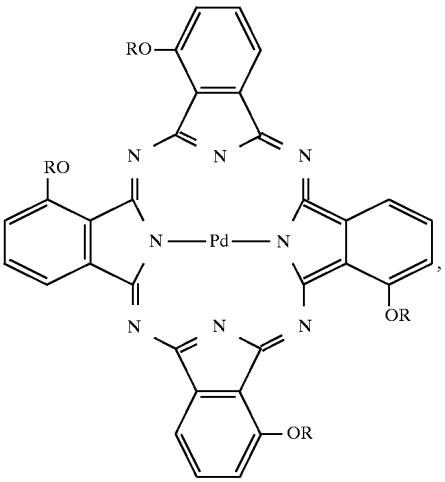

(f4)

wherein R represents the following group:

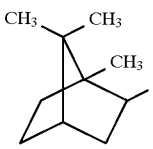

The thus obtained mixture of the phthalocyanine compounds exhibited λmax at 696 nm in chloroform.

Figure 5:
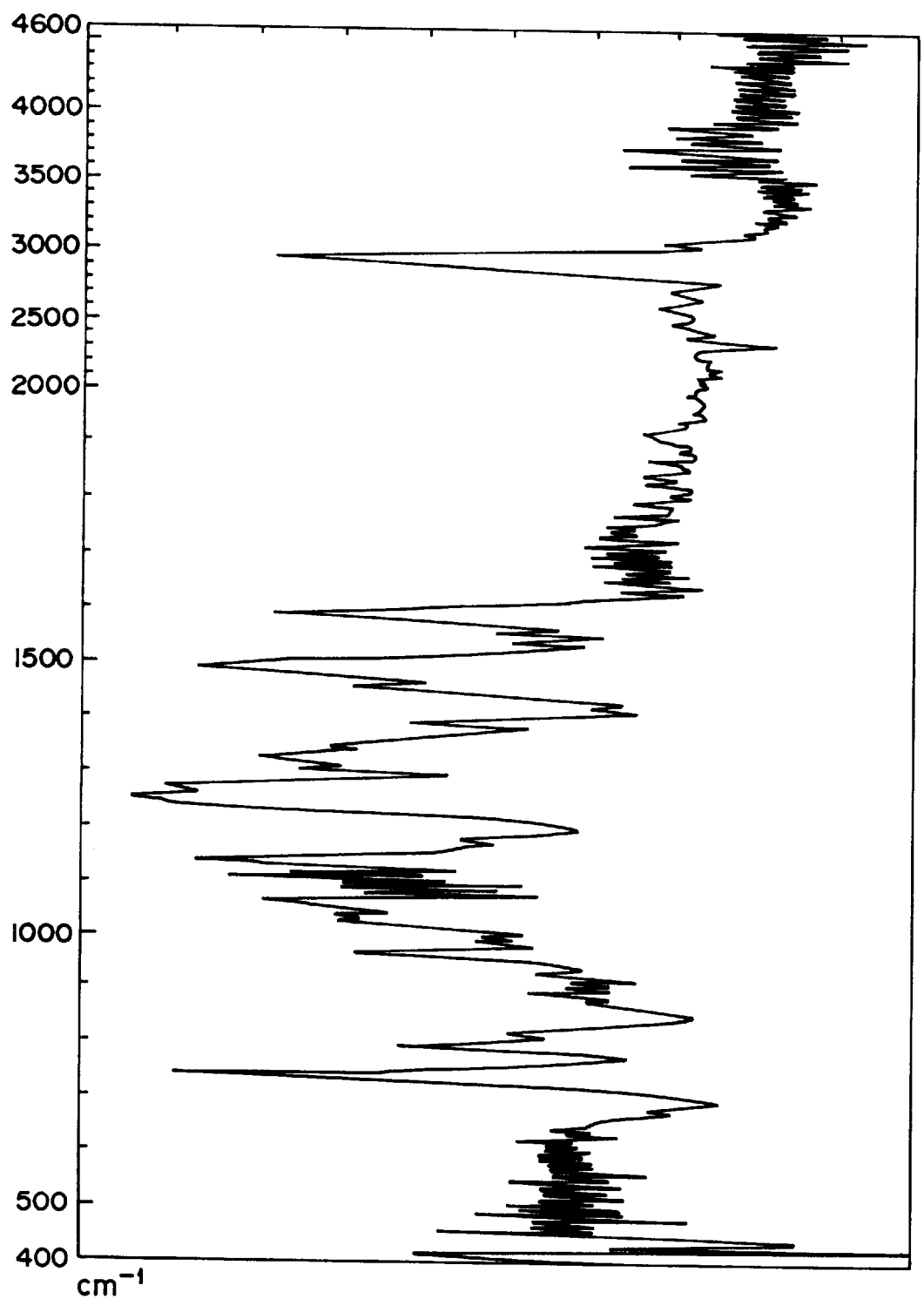
FIG. 5 is an infrared spectrum of a phthalocyanine compound of the present invention obtained in Synthesis Example II-6.

FIG. 5 is an infrared spectrum of the mixture of the phthalocyanine compounds.

Syntheses Examples II-7 to II-11

[Syntheses of phthalocyanine compounds]

Phthalocyanine compounds according to the present invention were synthesized by following the reaction procedure similar to that in Syntheses Example II-6.

The thus obtained phthalocyanine compounds are shown in Table II-(3). In each Synthesis Example, isomers are produced likewise as in Synthesis Example II-6, but not illustrated in Table II-(3).

Figure 6:
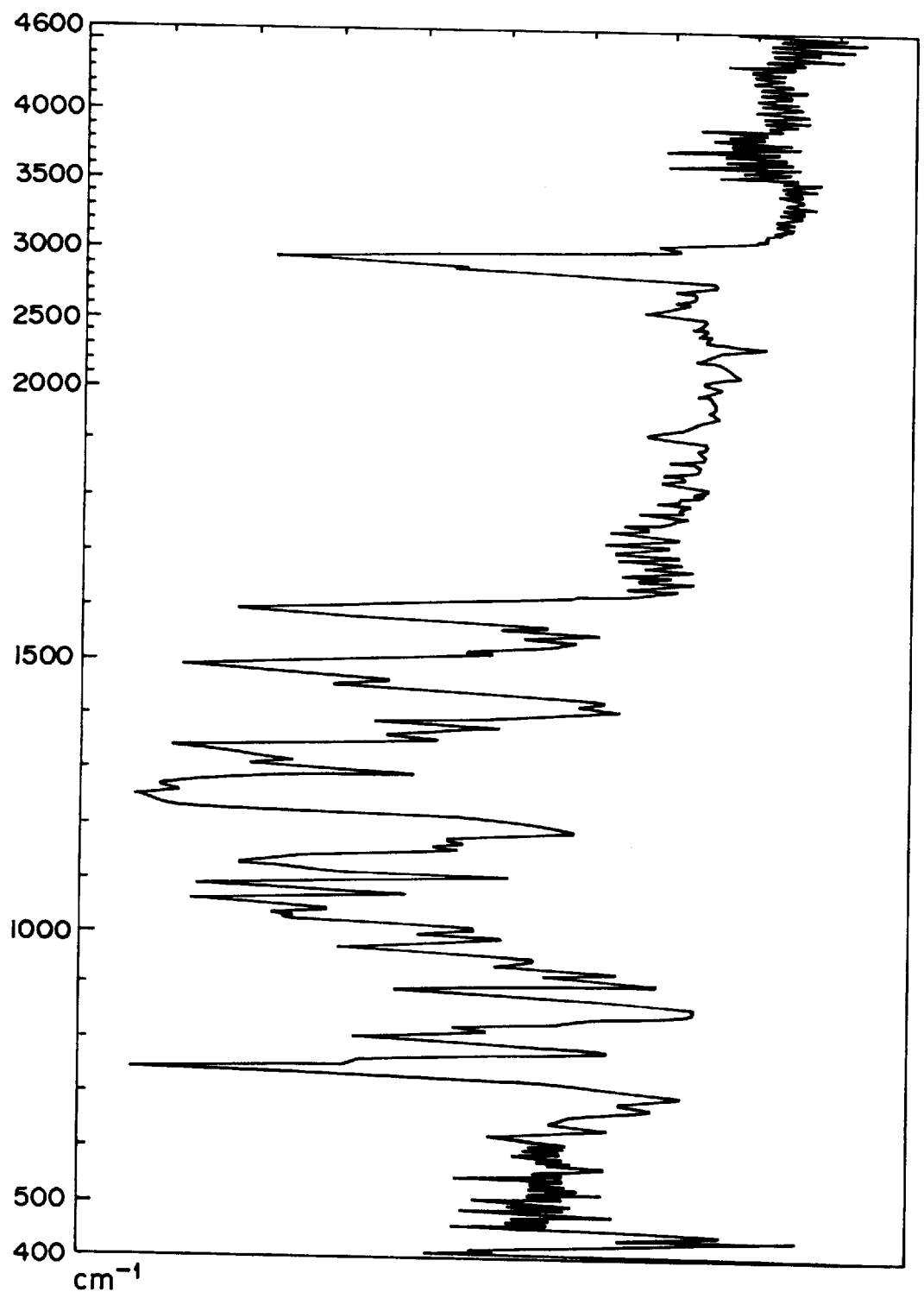
FIG. 6 is an infrared spectrum of a phthalocyanine compound of the present invention obtained in Synthesis Example II-7.
Figure 7:
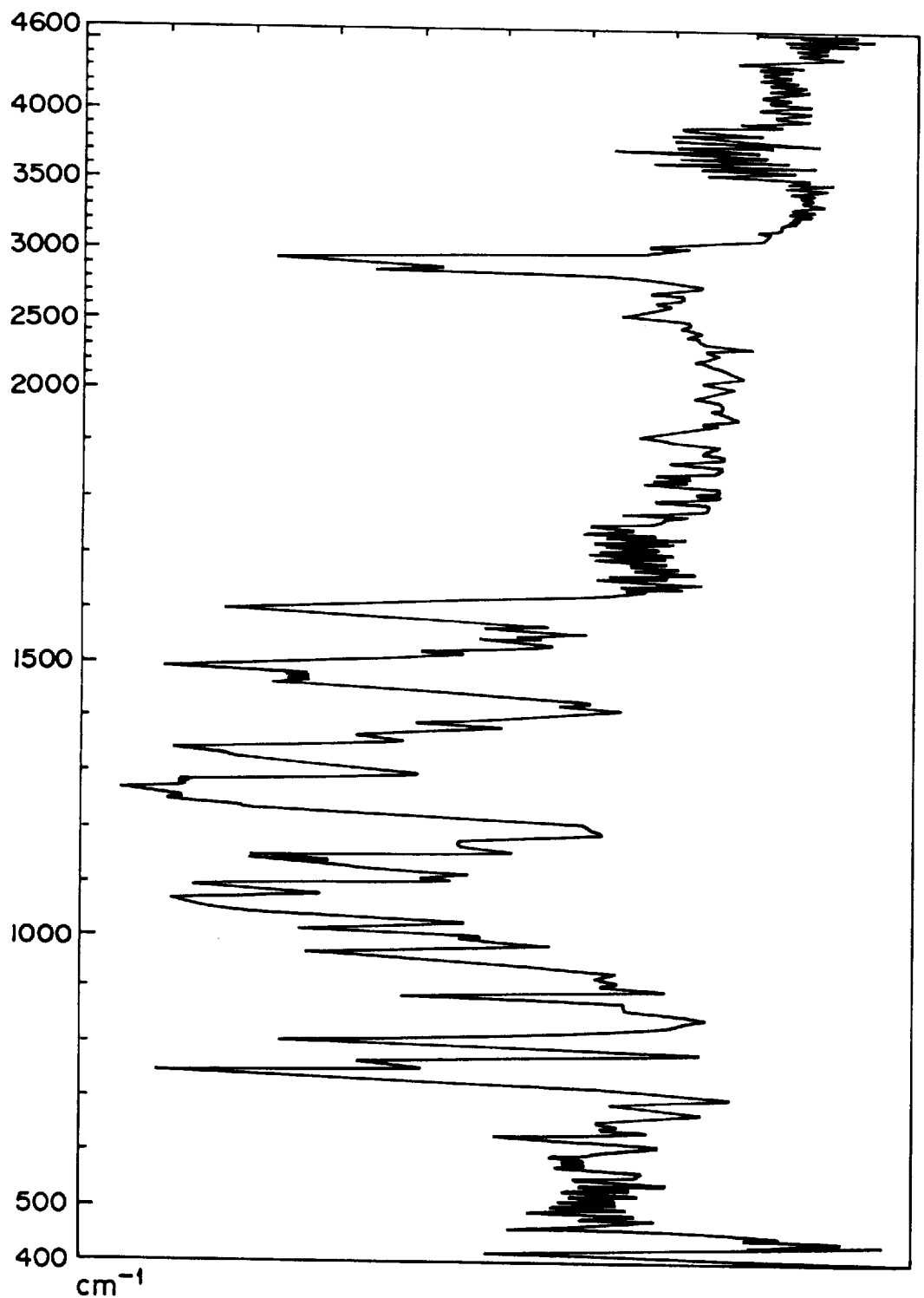
FIG. 7 is an infrared spectrum of a phthalocyanine compound of the present invention obtained in Synthesis Example II-8.

FIGS. 6, 7 and 8 are infrared spectra of the phthalocyanine compounds obtained in Synthesis Examples II-7, II-8 and II-9, respectively.

TABLE II-(3)

| Synthesis Example No. | M | X | R | λmax in Chloroform (nm) |
|---|---|---|---|---|
| II-7 | Cu | O | Me-C(Me)(Me)-norbornyl | 714 |
| II-8 | Cu | O | dimethyl-norbornyl-Me,Me | 714 |
| II-9 | Pd | O | dimethyl-norbornyl-Me,Me | 696 |
| II-10 | Zn | S | Me-C(Me)(Me)-norbornyl | 717 |
| II-11 | Ni | O | Me-C(Me)(Me)-norbornanone | 701 |

Synthesis Example II-12

[Halogenation of phthalocyanine compound]

1.3 g of the phthalocyanine compound synthesized in Synthesis Example II-6 was dissolved in a mixed solvent prepared by mixing 36 g of 1,1,2-trichloroethane, 4 g of hexane and 40 g of water. To the above prepared mixture solution, a solution prepared by dissolving 0.678 g of bromine in 6 g of 1,1,2-trichloroethane was added dropwise at 35° C. The temperature of the reaction mixture was raised to 55° C., and the mixture was stirred for 3 hours, After the reaction mixture was cooled to room temperature, 400 ml of toluene was added thereto. The resultant toluene layer was successively washed with sodium hydroxide and water, and concentrated. Thereafter, the toluene layer was chromatographed on silica gel and eluted with a mixed solvent of toluene and hexane with a ratio by volume of 6:4, whereby 1.59 g of brominated phthalocyanine compound was obtained.

Figure 9:
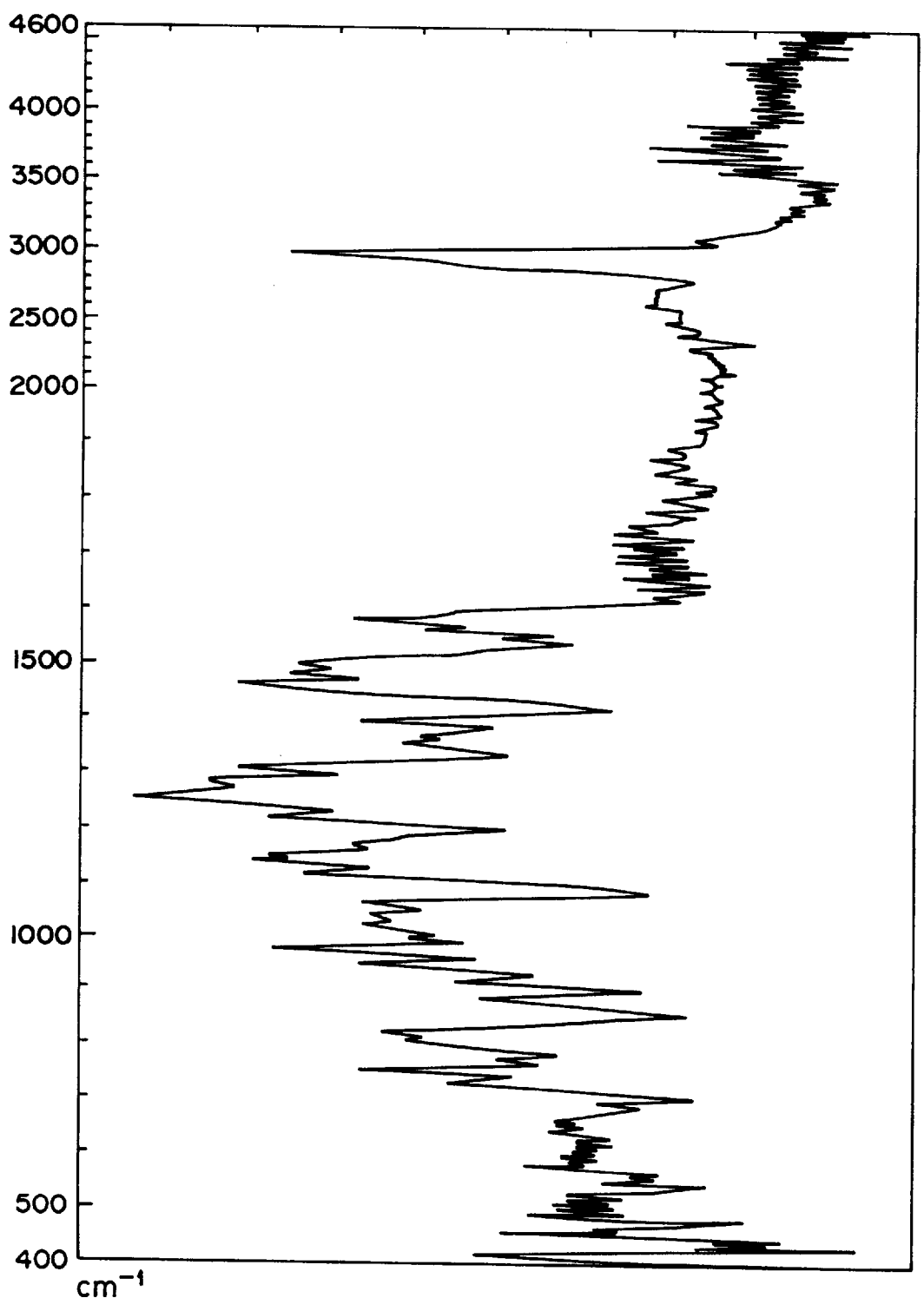
FIG. 9 is an infrared spectrum of a brominated phthalocyanine compound of the present invention obtained in Synthesis Example II-12.

FIG. 9 is an infrared spectrum of the above obtained brominated phthalocyanine compound.

As a result of the evaluation, each of the phthalocyanine compounds obtained in Synthesis Examples II-6 to II-12 was soluble in a variety of solvents, so that a film of each phthalocyanine compound was easily formed by solution coating method. In addition, all of the above-mentioned phthalocyanine compounds in the form of a film exhibited excellent absorption in the wavelength range of the near infrared rays.

EXAMPLE II-1

[Fabrication of optical information recording medium]

A guide groove with a depth of 1000 Å, a half width of 0.4 μm and a track pitch of 1.4 μm was formed on a photopolymer provided on a polymethyl methacrylate disk with a thickness of 1.2 μm, so that a substrate was prepared.

The phthalocyanine compound No. II-1 of the present invention as shown in Table II-(2) was dissolved in 1,2-dichloroethane, and the thus obtained solution of the phthalocyanine compound was applied to the above prepared substrate by spinner coating, so that a recording layer with a thickness of 800 Å was provided on the substrate.

Thus, an optical information recording medium No. II-1 according to the present invention was fabricated.

EXAMPLES II-2 to II-6
[Fabrication of optical information recording media]

The procedure for fabrication of the optical information recording medium No. II-1 in Example II-1 was repeated except that the phthalocyanine compound No. II-1 used as the recording material in Example II-1 was replaced by phthalocyanine compounds No. II-6, No. II-10, No. II-12, No. II-18 and No. II-20 shown in Table II-(2), respectively in Examples II-2, II-3, II-4, II-5 and II-6.

Thus, optical information recording media Nos. II-2 to II-6 according to the present invention were fabricated.

Comparative Example II-1
[Fabrication of optical information recording medium]

The procedure for fabrication of the optical information recording medium No. II-1 in Example II-1 was repeated except that the phthalocyanine compound No. II-1 used as the recording material in Example II-1 was replaced by a phthalocyanine compound represented by the following formula:

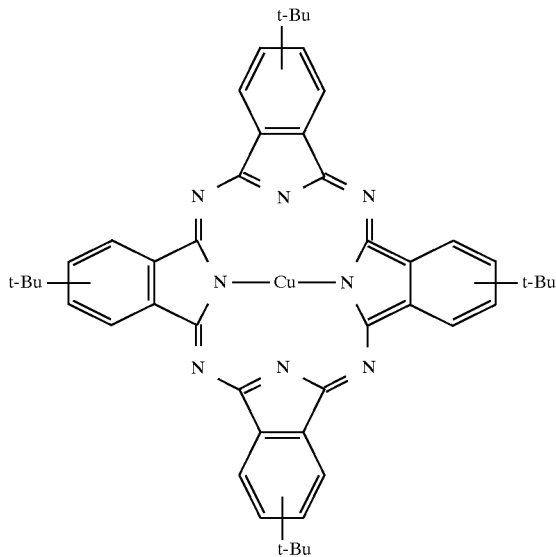

In practice, the employed phthalocyanine compound included isomers in which tert-butyl (t-Bu) is bonded to each benzene ring at the positions 2 and 3 in the above formula.

Thus, a comparative optical information recording medium No. II-1 was fabricated.

To evaluate the recording characteristics of each of the above prepared optical information recording media Nos. II-1 to II-6 according to the present invention and comparative optical information recording medium No. II-1, information was recorded by applying a laser beam with a wavelength of 680 nm to the substrate side of each recording medium, under the conditions that the recording frequency was 1.25 MHz, the linear speed was 2.1 m/sec, and N.A. of the pick-up lens was 0.5.

Using the same laser as employed in the above, a continuous wave laser beam having an intensity of 0.25 to 0.3 mW was applied to each recording medium to reproduce the recorded information, and the light reflected from the recording medium was detected. The detected light was subjected to a spectral analysis, using a scanning filter at a band width of 30 kHz, so that the initial C/N (carrier/noise) ratio was obtained.

Further, the reflectance (initial value) of a non-recorded portion on the guide groove was also measured by using the sane laser beams.

The results are shown in Table II-(4).

In addition to the above, each recording medium was caused to deteriorate by exposing it to xenon lamp of 35,000 lux for 300 hours. After exposure, the reflectance and the C/N ratio of each recording medium were measured in the same manner as in the above. The results are also shown in Table II-(4).

TABLE II-(4)

|  | Initial Value | | After Exposure to Light for 300 Hours | |
|---|---|---|---|---|
|  | Reflectance (%) | C/N (dB) | Reflectance (%) | C/N (dB) |
| Ex. II-1 | 26 | 49 | 25 | 49 |
| Ex. II-2 | 25 | 48 | 25 | 48 |
| Ex. II-3 | 27 | 49 | 26 | 48 |
| Ex. II-4 | 25 | 48 | 25 | 47 |
| Ex. II-5 | 23 | 46 | 23 | 46 |
| Ex. II-6 | 24 | 45 | 23 | 46 |
| Comp. Ex. II-1 | 13 | 34 | 13 | 33 |

EXAMPLE II-7
[Fabrication of optical information recording medium]

The phthalocyanine compound No. II-4 of the present invention as shown in Table II-(2) was dissolved in a mixed solvent of 2-ethoxyethanol, 1,2-dichloroethane and tetrahydrofuran at a mixing ratio by weight of 8:1.5:0.5.

The thus obtained solution of the phthalocyanine compound was applied to a polycarbonate substrate with a thickness of 1.2 μm by spinner coating, on which substrate a guide groove with a depth of 1000 Å, a half width of 0.45 μm and a track pitch of 1.6 μm was formed by injection molding, so that a recording layer with a thickness of 1800 Å was provided on the substrate.

Thereafter, Au was vacuum-deposited on the above prepared recording layer, so that a metal reflection layer with a thickness of 1200 Å was provided on the recording layer.

Then, an acrylic photopolymer was applied to the above prepared metal reflection layer by spinner coating, and subjected to ultraviolet curing treatment, so that a protective layer was provided on the metal reflection layer.

Thus, an optical information recording medium No. II-7 of a CD-R type according to the present invention was fabricated.

EXAMPLES II-8 to II-11
[Fabrication of optical information recording media]

The procedure for fabrication of the optical information recording medium No. II-7 in Example II-7 was repeated except that the phthalocyanine compound No. II-4 used as the recording material in Example II-7 was replaced by phthalocyanine compounds No. II-1, No. II-2, No. II-9, and No. II-21 shown in Table II-(2), respectively in Examples II-8, II-9, II-10, and II-11.

Thus, optical information recording media Nos. II-8 to II-11 according to the present invention were fabricated.

Comparative Example II-2
[Fabrication of optical information recording medium]

The procedure for fabrication of the optical information recording medium No. II-7 in Example II-7 was repeated except that the phthalocyanine compound No. II-4 used as the recording material in Example II-7 was replaced by the same phthalocyanine compound as employed in Comparative Example II-1.

Thus, a comparative optical information recording medium No. II-2 was fabricated.

Comparative Example II-3
[Fabrication of optical information recording medium]

The procedure for fabrication of the optical information recording medium No. II-7 in Example II-7 was repeated except that the phthalocyanine compound No. II-4 used as the recording material in Example II-7 was replaced by a compound of the following formula:

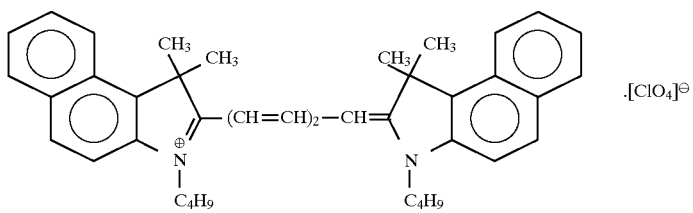

Thus, a comparative optical information recording medium No. II-3 was fabricated.

Comparative Example II-4

[Fabrication of optical information recording medium]

The procedure for fabrication of the comparative optical information recording medium No. II-3 in Comparative Example II-3 was repeated except that the compound used as the recording material in Comparative Example II-3 was replaced by a mixture prepared by adding a nickel complex compound of the following formula to the above-mentioned compound employed in Comparative Example II-3 at a ratio by weight of 10:100:

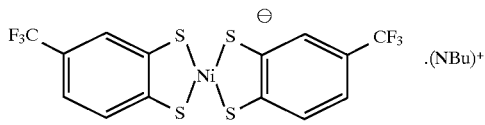

Thus, a comparative optical information recording medium No. II-4 was fabricated.

To evaluate the recording characteristics of each of the above prepared optical information recording media Nos. II-7 to II-11 according to the present invention and comparative optical information recording media Nos. II-2 to II-4, EFM signals were recorded by applying a laser beam with a wavelength of 790 nm to the substrate side of each recording medium at a linear speed of 1.4 m/sec. Then, the number of $C_1$ errors at the optimal power was measured.

In addition, the reflectance of a non-recorded portion of the recording medium was measured.

The results are shown in Table II-(5).

Furthermore, each recording medium was caused to deteriorate by exposing it to xenon lamp of 35,000 lux for 300 hours. After exposure, the reflectance and the number of $C_1$ errors of each recording medium were measured in the same manner as in the above. The results are also shown in Table II-(5).

TABLE II-(5)

| | Initial Value | | After Exposed to Light of 35,000 lux for 300 Hours | |
|---|---|---|---|---|
| | Reflectance (%) | Number of C1 Errors | Reflectance (%) | Number of C1 Errors |
| Ex. II-7 | 71 | 6 | 70 | 6 |
| Ex. II-8 | 68 | 8 | 67 | 8 |
| Ex. II-9 | 67 | 19 | 67 | 19 |
| Ex. II-10 | 72 | 5 | 71 | 5 |
| Ex. II-11 | 72 | 5 | 70 | 5 |
| Comp. Ex. II-2 | 32 | >3000 | 30 | >3000 |
| Comp. Ex. II-3 | 73 | 3 | 15 | >3000 |
| Comp. Ex. II-4 | 72 | 5 | 40 | >2000 |

As a result of the evaluations, the optical information recording media according to the present invention exhibit high light absorption and light reflectance in the wavelength range of 630 to 720 nm. Therefore, these optical information recording media are applicable to the pick-up system using a semiconductor laser beam with a wavelength of 630 to 720 nm.

In addition, the optical information recording media according to the present invention exhibit high refractive index in the wavelength range of 770 to 830 nm, and excellent stability, so that these recording media can provide CD-R media with high reflectance, excellent shelf stability and excellent reproduction stability.

As previously explained, the phthalonitrile compound of formula I-(I) or II-(I), and the diiminoisoindoline compound of formula I-(II) or II-(II) are usable as intermediates for the preparation of the near-infrared absorbing material comprising a phthalocyanine compound of formula I-(III) or II-(III).

The near-infrared absorbing material comprising a phthalocyanine compound of formula I-(III) or II-(III) is provided with not only thermal stability and photo-stability inherent in the conventional phthalocyanine compounds, but also high solubility in a variety of organic solvents, and high absorption in the infrared region. As the result, a film of the above-mentioned near-infrared absorbing material comprising a phthalocyanine compound can be formed by solution coating method, so that the applications of such a near-infrared absorbing material are remarkably broadened, and in particular, the application to an optical information recording medium becomes very significant.

The phthalonitrile compound of formula I-(I) or II-(I), and the metallo- or metal-free phthalocyanine compound of formula I-(III) or II-(III) can be easily synthesized under moderate conditions. Namely, the methods of producing the phthalonitrile compound and the metallo- or metal-free phthalocyanine compound according to the present invention are remarkably advantageous from the industrial viewpoint.

The optical information recording medium according to the present invention comprises as a recording material the previously mentioned phthalocyanine compound I-(III) or II-(III) capable of absorbing near infrared rays, so that the following advantages can be obtained:

(1) The optical information recording medium exhibits high absorption and high light reflectance in the wavelength range of 630 to 720 nm. Therefore, the optical information recording medium is applicable to the pick-up system using a semiconductor laser beam of 630 to 720 nm which is capable of recording information with high density. Consequently, the recording density of the optical information recording medium according to the present invention is 1.6 to 1.7 times that of the conventional optical information recording medium employing a laser beam of 770 to 830 nm.

(2) The optical information recording medium of the present invention can exhibit high refractive index in the wavelength range of 770 to 830 nm, and excellent stability. Therefore, there can be provided a recording medium of a CD-R type with high reflectance, high shelf stability and excellent reproduction stability.

Furthermore, when the phthalocyanine compound of formula I-(III) or II-(III) in which each of k, l, m and n is an integer of 1 or 2, one or two substituents are bonded to each benzene ring at the position 1 and/or 4, and the other substituents are a hydrogen atom or a halogen atom is used as the recording material in the optical information recording medium, the absorption region of the recording material can be easily controlled and association of molecules of the phthalocyanine compound can be effectively prevented, thereby further increasing the refractive index and the reflectance of the obtained recording layer.

What is claimed is:

1. An optical information recording medium comprising a substrate, and a recording layer formed thereon comprising a phthalocyanine compound of formula I-(III):

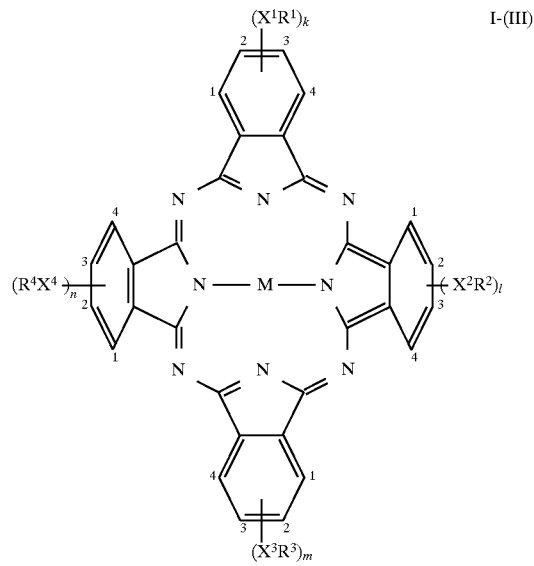

wherein M represents two hydrogen atoms, or a bivalent, trivalent or tetravalent metal which may have a halogen atom or an oxygen atom; $X^1$ to $X^4$ are each an oxygen atom or sulfur atom; $R^1$ to $R^4$ are each a cyclic substituent selected from the group consisting of cyclic substituents (a) to (f), each of which may independently have a substituent:

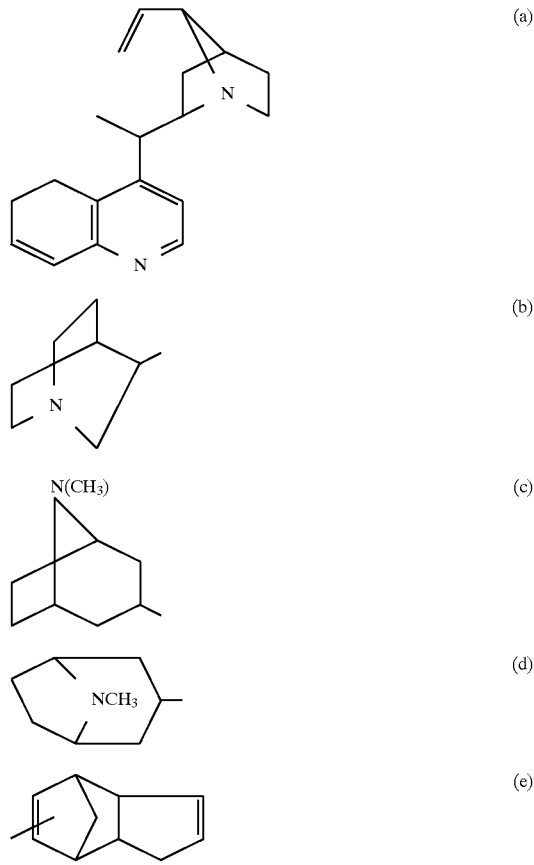

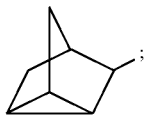 (f)

and k, l, m, and n are each an integer of 0 to 4, provided that k, l, m, and n are not 0 at the same time, and that when each of k, l, m and n is 3 or less, the other substituents for each benzene ring are a hydrogen atom or a halogen atom.

2. The optical information recording medium as claimed in claim 1, further comprising an undercoat layer which is provided between said substrate and said recording layer.

3. The optical information recording medium as claimed in claim 2, further comprising a protective layer which is provided on said recording layer.

4. The optical information recording medium as claimed in claim 1, further comprising a protective layer which is provided on said recording layer.

5. The optical information recording medium as claimed in claim 4, further comprising a metal reflection layer which is provided between said recording layer and said protective layer.

6. The optical information recording medium as claimed in claim 1, wherein each of k, l, m and n is an integer of 1 or 2, one or two substituents are bonded to each benzene ring at the position 1 and/or 4, and the other substituents are a hydrogen atom or a halogen atom in said phthalocyanine compound of formula I-(III).

7. The optical information recording medium as claimed in claim 6, further comprising an undercoat layer which is provided between said substrate and said recording layer.

8. The optical information recording medium as claimed in claim 7, further comprising a protective layer which is provided on said recording layer.

9. The optical information recording medium as claimed in claim 6, further comprising a protective layer which is provided on said recording layer.

10. The optical information recording medium as claimed in claim 9, further comprising a metal reflection layer which is provided between said recording layer and said protective layer.

* * * * *